US 12,401,607 B2

United States Patent
Sha et al.

(10) Patent No.: US 12,401,607 B2
(45) Date of Patent: Aug. 26, 2025

(54) VIRTUAL-FIGURE-BASED DATA PROCESSING METHOD AND APPARATUS, COMPUTER DEVICE, AND STORAGE MEDIUM

(71) Applicant: TENCENT TECHNOLOGY (SHENZHEN) COMPANY LIMITED, Guangdong (CN)

(72) Inventors: Sha Sha, Shenzhen (CN); Liqiang Liu, Shenzhen (CN); Xianmin Xiao, Shenzhen (CN); Qinghua Zhong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 73 days.

(21) Appl. No.: 18/322,944

(22) Filed: May 24, 2023

(65) Prior Publication Data
US 2023/0328012 A1    Oct. 12, 2023

Related U.S. Application Data

(63) Continuation of application No. PCT/CN2022/118197, filed on Sep. 9, 2022.

(30) Foreign Application Priority Data

Oct. 28, 2021 (CN) .......................... 202111261940.2

(51) Int. Cl.
*H04L 51/063* (2022.01)
*G06F 3/0482* (2013.01)
(Continued)

(52) U.S. Cl.
CPC .......... *H04L 51/063* (2013.01); *G06F 3/0482* (2013.01); *G06T 11/00* (2013.01);
(Continued)

(58) Field of Classification Search
CPC ...... H04L 51/216; H04L 51/04; H04L 41/026
See application file for complete search history.

(56) References Cited

U.S. PATENT DOCUMENTS 9,652,809 B1     5/2017  Levinson
10,325,417 B1 *  6/2019  Scapel .................... G06T 19/20
                         (Continued)

FOREIGN PATENT DOCUMENTS

CN      1757057 A      4/2006
CN    111506184 A      8/2020
                (Continued)

OTHER PUBLICATIONS

Written Opinion for PCT/CN2022/118197, dated Nov. 18, 2022.
International Search Report for PCT/CN2022/118197, dated Nov. 18, 2022.

*Primary Examiner* — Tan H Tran
(74) *Attorney, Agent, or Firm* — Sughrue Mion, PLLC

(57) ABSTRACT

A virtual-figure-based data processing method and apparatus that can: display a conversation interface for a conversation between a first object and a second object, and display a first virtual figure of the first object and a second virtual figure of the second object in a virtual figure display region of the conversation interface (S101); display, in a message display region of the conversation interface in response to a trigger operation on the conversation interface, a first conversation message transmitted by the first object to the second object (S102), the first conversation message carrying first object media data associated with the first object; and update the first virtual figure to a first virtual update figure in the virtual figure display region including the second virtual figure, the first virtual update figure being obtained by updating the first virtual figure based on the first object media data (S103).

20 Claims, 18 Drawing Sheets

(51) Int. Cl.
*G06T 11/00* (2006.01)
*G06V 40/16* (2022.01)
*H04L 51/216* (2022.01)

(52) U.S. Cl.
CPC .......... *G06V 40/174* (2022.01); *H04L 51/216* (2022.05); *G06F 2203/04803* (2013.01)

(56) References Cited

U.S. PATENT DOCUMENTS

| | | | | |
|---|---|---|---|---|
| 2007/0168863 | A1* | 7/2007 | Blattner | G06F 3/011 715/706 |
| 2014/0052794 | A1* | 2/2014 | Tucker | H04L 51/063 709/206 |
| 2019/0102049 | A1* | 4/2019 | Anzures | G06F 3/0482 |
| 2019/0228552 | A1* | 7/2019 | Lee | G06T 11/60 |
| 2022/0191157 | A1* | 6/2022 | Lee | H04L 51/063 |

FOREIGN PATENT DOCUMENTS

| | | |
|---|---|---|
| CN | 112152901 A | 12/2020 |
| CN | 113011471 A | 6/2021 |

\* cited by examiner

VIRTUAL-FIGURE-BASED DATA PROCESSING METHOD AND APPARATUS, COMPUTER DEVICE, AND STORAGE MEDIUM

CROSS-REFERENCE TO RELATED APPLICATION

This application is a continuation of International Application No. PCT/CN2022/118197 filed on Sep. 9, 2022 and claims priority to Chinese Patent Application No. 202111261940.2, filed with the China National Intellectual Property Administration on Oct. 28, 2021, the disclosure of both being incorporated by reference in their entireties.

FIELD

Embodiments of the disclosure relate to the field of Internet technologies, and in particular, to a virtual-figure-based data processing method and apparatus, a computer device, a computer-readable storage medium, and a computer program product.

BACKGROUND

With constant development of an Internet technology, more and more objects (that is, users) tend to communicate with others by using applications with a session function. In a conversation, the object may transmit various multimedia data as required, for example, a text, an image, a voice, or audio, thereby implementing information exchange and propagation.

In an existing conversation scene, for example, in a process of communicating by using a text-type conversation or a voice-type conversation, object statuses of both sides are unlikely to present visually. In a process of communicating by using an audio/video-type conversation, objects may present own object statuses (for example, emotions) in real time by changing virtual figures, to enhance presence in the conversation. However, this conversation mode has the problem that it is hard to trace a historical conversation message. Thus, it can be seen that an existing conversation display mode is undiversified, and a historical conversation message cannot be recorded and displayed in a virtual-figure-based conversation scene.

SUMMARY

Various embodiments of the disclosure provide a virtual-figure-based data processing method and apparatus, a computer device, a computer-readable storage medium, and a computer program product.

A virtual-figure-based data processing method is provided, which is performed by a computer device and includes:

displaying a conversation interface for a conversation between a first object and a second object, and displaying a first virtual figure of the first object and a second virtual figure of the second object in a virtual figure display region of the conversation interface;

displaying, in a message display region of the conversation interface in response to a trigger operation on the conversation interface, a first conversation message transmitted by the first object to the second object, the first conversation message carrying first object media data associated with the first object; and updating the first virtual figure to a first virtual update figure in the virtual figure display region including the second virtual figure, the first virtual update figure being obtained by updating the first virtual figure based on the first object media data.

A virtual-figure-based data processing method is provided, which includes:

displaying a conversation interface for a conversation between a first object and a second object, and displaying a first virtual figure of the first object and a second virtual figure of the second object in a virtual figure display region of the conversation interface;

outputting, in response to a trigger operation on the conversation interface, a voice control and an image capturing region configured to capture object image data of the first object, and displaying, during entry of voice information by the first object by using the voice control, conversation image data of the first object in the conversation in the image capturing region; and displaying, in a message display region of the conversation interface, a first conversation message transmitted by the first object to the second object, the first conversation message carrying first object media data associated with the first object, and the first object media data being determined based on the conversation image data and the voice information.

A virtual-figure-based data processing apparatus is provided, which includes:

a first display module, configured to display a conversation interface for a conversation between a first object and a second object, and display a first virtual figure of the first object and a second virtual figure of the second object in a virtual figure display region of the conversation interface;

a second display module, configured to display, in a message display region of the conversation interface in response to a trigger operation on the conversation interface, a first conversation message transmitted by the first object to the second object, the first conversation message carrying first object media data associated with the first object; and a first update module, configured to update the first virtual figure to a first virtual update figure in the virtual figure display region including the second virtual figure, the first virtual update figure being obtained by updating the first virtual figure based on the first object media data.

A virtual-figure-based data processing apparatus is provided, which includes:

a first display module, configured to display a conversation interface for a conversation between a first object and a second object, and display a first virtual figure of the first object and a second virtual figure of the second object in a virtual figure display region of the conversation interface;

a voice entry module, configured to output, in response to a trigger operation on the conversation interface, a voice control and an image capturing region configured to capture object image data of the first object, and display, during entry of voice information by the first object by using the voice control, conversation image data of the first object in the conversation in the image capturing region; and a second display module, configured to display, in a message display region of the conversation interface, a first conversation message transmitted by the first object to the second object, the first conversation message carrying first object media data associated with the first object, and the first object media data being determined based on the conversation image data and the voice information.

An aspect of the embodiments of the disclosure provides a computer device, including one or more processors and a memory.

The memory may be configured to store computer-readable instructions. When the computer-readable instructions are executed by the one or more processors, the computer device is enabled to perform the method provided in the embodiments of the disclosure.

An aspect of the embodiments of the disclosure provides a computer-readable storage medium. The computer-readable storage medium stores a computer program. The computer program is suitable for one or more processors to load and execute to enable a computer device with the one or more processors to perform the method provided in the embodiments of the disclosure.

An aspect of the embodiments of the disclosure provides a computer program product or computer program. The computer program product or computer program includes computer-readable instructions. One or more processors execute the computer-readable instructions to implement the method provided in the embodiments of the disclosure.

BRIEF DESCRIPTION OF THE DRAWINGS

In order to describe the technical solutions in the embodiments of the disclosure or the related art more clearly, the accompanying drawings required to be used in descriptions about the embodiments or the related art are briefly described below. Apparently, the accompanying drawings in the descriptions below are merely some embodiments of the disclosure. A person of ordinary skill in the art may further obtain other accompanying drawings according to these drawings without creative efforts.

DETAILED DESCRIPTION

To make objectives, technical solutions, and advantages of the disclosure clearer, the following further describes implementations of this application in detail with reference to the accompanying drawings. The described embodiments are not to be construed as a limitation to the present disclosure. Clearly, the described embodiments are not all but merely some embodiments of the disclosure. All other embodiments obtained by a person of ordinary skill in the art based on the embodiments of the disclosure without creative efforts shall fall within the protection scope of the disclosure.

Figure 1:
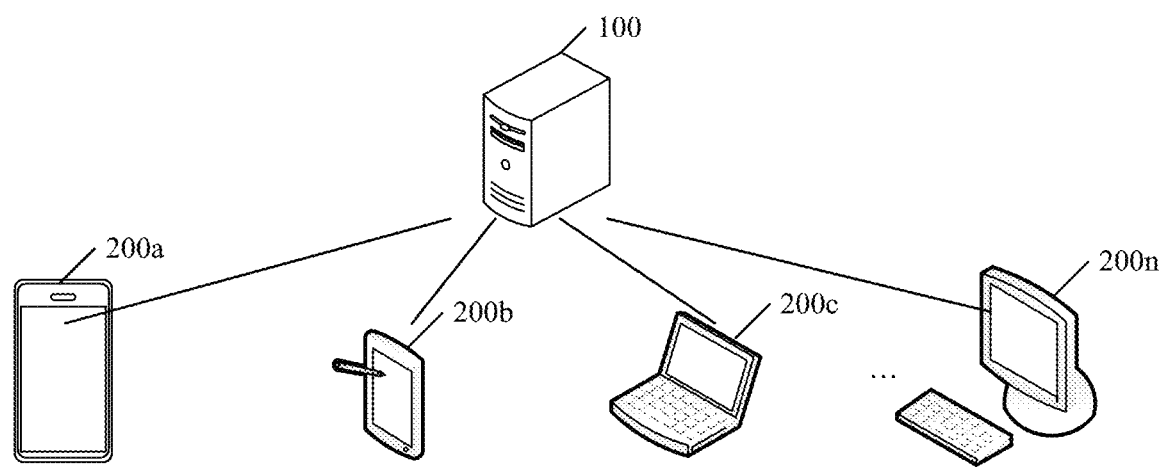
FIG. 1 is a schematic diagram of a network architecture according to some embodiments of the disclosure.

Refer to FIG. 1. FIG. 1 is a schematic diagram of a network architecture according to some embodiments of the disclosure. As shown in FIG. 1, the network architecture may include a server 100 and a terminal cluster. The terminal cluster may include a user terminal 200a, a user terminal 200b, a user terminal 200c, . . . , and a user terminal 200n. There may be a communication connection between the user terminals in the terminal cluster. For example, there may be a communication connection between the user terminal 200a and the user terminal 200b, and there may be a communication connection between the user terminal 200a and the user terminal 200c. In addition, there may be a communication connection between any user terminal in the terminal cluster and the server 100. For example, there may be a communication connection between the user terminal 200a and the server 100. A connection manner for the communication connection is not limited. Wired communication may be used for direct or indirect connection, wireless communication may be used for direct or indirect connection, or another manner may be used. This is not limited herein in the disclosure.

It is to be understood that an application client may be installed in each user terminal in the terminal cluster shown in FIG. 1, and when run in each user terminal, the application client may perform data interaction with the server 100 shown in FIG. 1. The application client may be an application client with a conversation function, for example, an instant messaging application, a social application, a livestreaming application, a short video application, a video application, a music application, a shopping application, a game application, a novel application, a payment application, or a browser. The application client may be an independent client, or an embedded subclient integrated into a specific client (for example, a social client or a game client). This is not limited herein. A conversation may also be referred to as instant messaging and instant chatting, is a system service for real-time communication on the Internet, and may support real-time transmission of an information flow, for example, a text, a voice, a video, an image, or a document. An instant messaging application is used as an example. The server 100 may include a plurality of servers corresponding to the instant messaging application, for example, a background server and a data processing server. Therefore, each user terminal may perform data transmission with the server 100 by using an application client corresponding to the instant messaging application. For example, each user terminal may conduct a conversation with another user terminal through the server 100, for communication and sharing anytime anywhere. For example, instant messaging may be performed between different user terminals in a form of transmitting and receiving conversation messages.

For ease of understanding, the user terminal 200a and the user terminal 200b are used as an example. The user terminal 200a may generate a conversation message A by using the instant messaging application installed in the user terminal 200a, and further transmit the conversation message to the server 100. The user terminal 200b may receive the conversation message A through the server 100, and display the conversation message A on a conversation interface corresponding to the user terminal 200b. Similarly, the user terminal 200b may transmit a conversation message B through the server 100 by using the instant messaging application installed in the user terminal 200b. In this way, the conversation between the user terminal 200a and the user terminal 200b is implemented.

The conversation message may include one or more message types, for example, a text message, a voice message, a sticker message, a picture message (which may include a static picture and a dynamic picture), a link message, an applet message, a video message, a file message, and a virtual object message (which may be used for sending and receiving a virtual object, for example, a virtual gift or a virtual red packet). A specific type of the conversation message is not limited in this embodiment of the disclosure.

It may be understood that a method provided in the embodiments of the disclosure may be performed by a computer device. The computer device includes but is not limited to a user terminal or a server. The server may be an independent physical server, a server cluster or distributed system including a plurality of physical servers, or a cloud server providing a basic cloud computing service such as a cloud database, a cloud service, cloud computing, a cloud function, cloud storage, a network service, cloud communication, a middleware service, domain name service, a security service, a content delivery network (CDN), or a big data and artificial intelligence platform. The user terminal may be an intelligent terminal capable of running the application client with the conversation function, for example, a smartphone, a tablet computer, a notebook computer, a desktop computer, a palm computer, a mobile Internet device (MID), a wearable device (for example, a smartwatch or a smart band), an intelligent computer, or an intelligent in-vehicle terminal. The user terminal may be directly or indirectly connected to the server in a wired or wireless manner. This is not limited herein in the embodiment of the disclosure.

It is to be noted that the user terminal may provide a conversation interface for an object to transmit and receive a conversation message, and vividly display an object status of the object by full use of a virtual figure of the object in a conversation. The object herein may be a user participating in the conversation (for example, a user A and a user B). A quantity of objects participating in a same conversation may be one or more. A specific quantity of objects is not limited in the embodiments of the disclosure. For ease of understanding and describing subsequent content, in the embodiments of the disclosure, the objects participating in the same conversation include a first object (for example, an object A) and a second object (for example, an object B). The first object may be a conversation message transmitter (which may also be referred to as a transmission object) or a conversation message receiver (which may also be referred to as a receiving object). Similarly, the second object may be a conversation message transmitter or a conversation message receiver. This is not limited in the embodiments of the disclosure. The object status may be an emotion/affection of the object in the conversation, for example, happy, excited, sad, scared, or confused. The object status may be reflected by a facial expression, a body movement, or a conversation message of the object. It is to be understood that the object may appear as a virtual figure in a virtual social scene. Therefore, in the embodiments of the disclosure, a virtual figure of the first object is referred to as a first virtual figure, and a virtual figure of the second object is referred to as a second virtual figure. The virtual figure may be a virtual figure pre-configured by the object as required, for example, obtained by selecting and combining corresponding figure resources (for example, a virtual wear, a makeup, or a hairstyle) in a figure resource library, or a virtual figure that is reconstructed based on a real figure of the object and that fits the object, for example, a virtual figure obtained by a rendering engine on the application client through rendering according to acquired real object data (for example, a facial form, a hairstyle, or clothes of the object). The virtual social scene may be a future-Internet-based three-dimensional (3D) virtual space that presents features of convergence and physical persistence by using virtual augmented physical reality and that has link sensing and sharing features, or an interactive, immersive, and collaborative world.

Specifically, the embodiments of the disclosure provide a virtual-figure-based conversation design. When the first object conducts the conversation with the second object, a user terminal of the first object may display a conversation interface for the conversation, display the first virtual figure of the first object and the second virtual figure of the second object in a virtual figure display region of the conversation interface, and further display, in a message display region of the conversation interface in response to a trigger operation on the conversation interface, a first conversation message transmitted by the first object to the second object. Further, since the first conversation message carries first object media data associated with the first object, the user terminal may update, based on the first object media data, the first virtual figure to a first virtual update figure in the virtual figure display region including the second virtual figure. That is, the conversation interface provided in the embodiments of the disclosure may include the virtual figure display region and the message display region. The virtual figure display region may be configured to display the virtual figures of both sides of the conversation. The message display region may be configured to display a historical conversation message generated in the conversation. Therefore, any object may conveniently browse the historical conversation message by using the corresponding message display region. That is, the historical conversation message may be traceable. In addition, to enrich a conversation display mode, in the embodiments of the disclosure, a corresponding virtual figure (for example, the first virtual figure) may be updated based on object media data (for example, the first object media data) carried in a conversation message (for example, the first conversation message), to present an object status of an object corresponding to the virtual figure in real time. The object media data may be media data that may be carried in the conversation message and that may be associated with the object, including, but not limited to, text data, image data, voice data, and the like. The object media data may affect the virtual figure of the object. For example, when a conversation message X carries image data Y (for example, a "smile" sticker) for representing an object status of the object A in the conversation, a virtual figure of the object A may change with the image data Y. It is to be understood that in the embodiments of the disclosure, object media data that may be carried in the first conversation message and that may be associated with the first object may be referred to as the first object media data. Similarly, object media data that may be carried in a conversation message transmitted by the second object to the first object and that may be associated with the second object may subsequently be referred to as second object media data.

Figure 2:
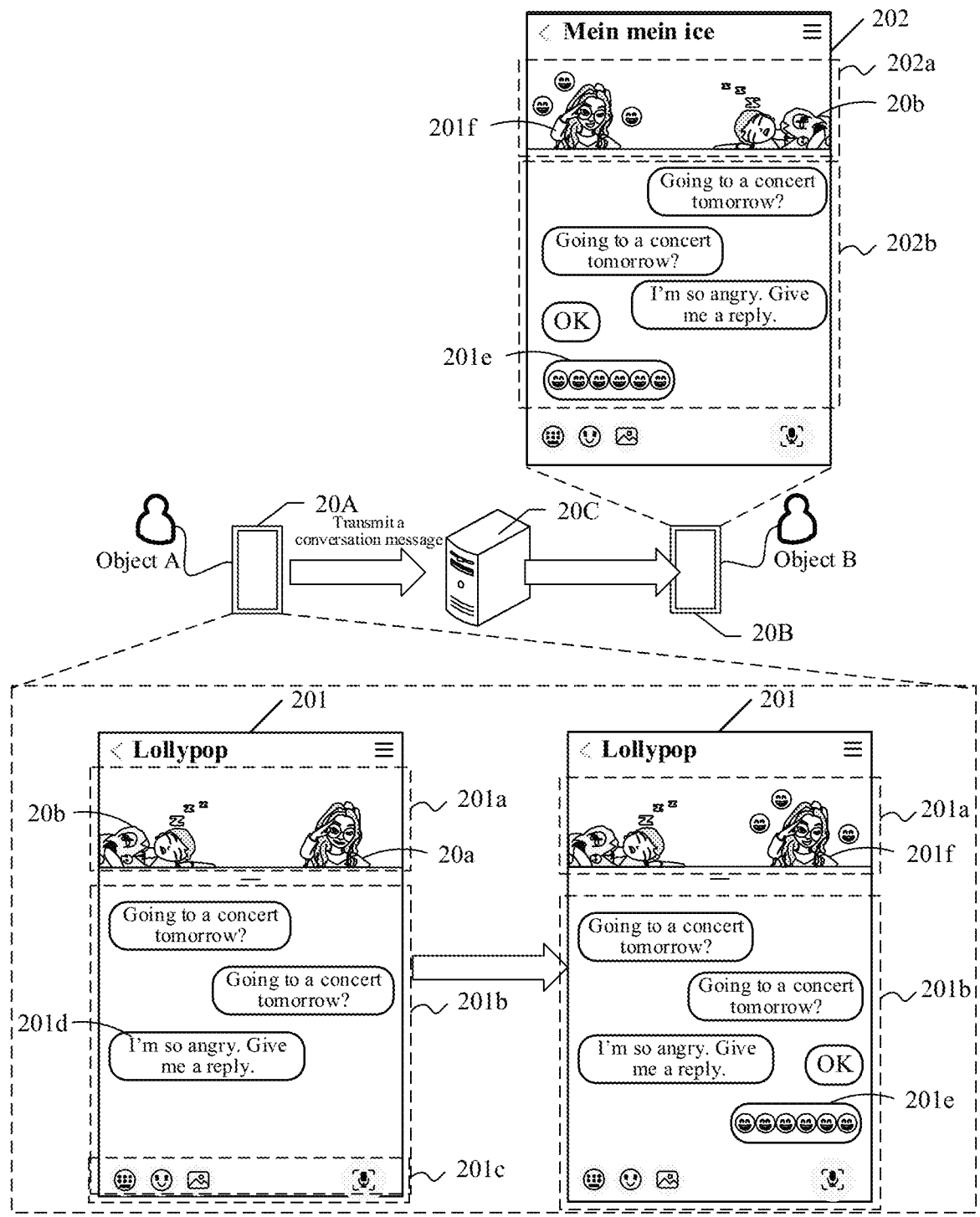
FIG. 2 is a schematic diagram of a virtual-figure-based data processing scene according to some embodiments of the disclosure.

For ease of understanding, refer to FIG. 2 together. FIG. 2 is a schematic diagram of a virtual-figure-based data processing scene according to some embodiments of the disclosure. An implementation process of the data processing scene may be performed in the server 100 shown in FIG. 1, may be performed in a user terminal, or may be performed by both a user terminal and a server. This is not limited herein. In some embodiments of the disclosure, an example in which a user terminal 20A, a user terminal 20B, and a server 20C interact is used for description. The user terminal 20A may be any user terminal, for example, the user terminal 200a, in the terminal cluster shown in FIG. 1. The user terminal 20B may be any user terminal, for example, the user terminal 200b, in the terminal cluster shown in FIG. 1. The server 20C may be the server 100 shown in FIG. 1.

As shown in FIG. 2, the object A and the object B are two sides in the conversation respectively. The object A may be the first object, and the object B may be the second object. The object A has a binding relationship with the user terminal 20A. The object B has a binding relationship with the user terminal 20B. The object A and the object B may conduct the conversation by using the user terminals bound therewith respectively. For ease of understanding and distinguishing, in some embodiments of the disclosure, a user terminal corresponding to the first object may be referred to as a first terminal (for example, the user terminal 20A), and a user terminal corresponding to the second object may be referred to as a second terminal (for example, the user terminal 20B). It is to be understood that both the first terminal and the second terminal may transmit and receive conversation messages. Therefore, in some embodiments of the disclosure, when the first terminal transmits a conversation message to the second terminal, the first terminal is a transmission terminal, and the second terminal is a receiving terminal. When the second terminal transmits a conversation message to the first terminal, the second terminal is a transmission terminal, and the first terminal is a receiving terminal.

It is to be understood that a process in which the user terminal 20A transmits a conversation message to the user terminal 20B may be the same as a process in which the user terminal 20B transmits a conversation message to the user terminal 20A. In some embodiments of the disclosure, an example in which the user terminal 20A is a transmission terminal and the user terminal 20B is a receiving terminal is used merely for description.

Specifically, after running an application client installed in the user terminal 20A, the user terminal 20A (that is, the first terminal) may first display an application home page of the application client, display a message list on the application home page, and further output, in response to a selection operation on the list message, a conversation interface 201 (which may also be referred to as a first conversation interface) for a conversation with the object B. In some embodiments, a conversation object list may be displayed in response to a switching operation on the application home page, and a conversation interface 201 for a conversation with the object B may further be output in response to a selection operation on the conversation object list. As shown in FIG. 2, an object name of the object B, for example, "Lollypop", may be displayed on the conversation interface 201 to indicate an object currently communicating with the object A. The conversation interface 201 may further include a virtual figure display region 201a. The virtual figure display region 201a may be configured to display a virtual figure (that is, the first virtual figure, for example, a virtual FIG. 20a) of the object A and a virtual figure (that is, the second virtual figure, for example, a virtual FIG. 20b) of the object B. Various virtual figures are displayed herein, which may be a two-dimensional (2D) virtual figure or 3D virtual figure, a static virtual figure or dynamic virtual figure, or a partial virtual figure or complete virtual figure. A specific form of the virtual figure is not limited in some embodiments of the disclosure.

It is to be understood that the virtual figure may be selected independently by the object as required. For example, the user terminal 20A may display one or more virtual figures in response to a trigger operation performed by the object A on the conversation interface 201, and further determine, in response to a virtual figure selection operation on the one or more virtual figures, a virtual figure corresponding to the virtual figure selection operation as the virtual figure of the object A. In some embodiments, the corresponding virtual figure may be reconstructed according to acquired real object data (for example, a facial form, a hairstyle, or clothes of the object). For example, the user terminal 20A may invoke a camera to acquire image data of the object A, further extract real object data of the object A from the image data, and invoke a rendering engine to obtain the virtual figure of the object A through rendering according to the real object data. In some embodiments, matching may be performed in the figure resource library according to acquired real object data, and matched figure resources are combined, thereby obtaining the corresponding virtual figure. In some embodiments, the virtual figure of the object A may be adjusted. For example, a virtual wear (for example, clothes, a head-wear, a hat, eyeglasses, or a knapsack), a hairstyle, and a makeup (for example, an eye shape, an eyeshadow, a lip shape, a lip color, or a cheek color) of the virtual figure may be adjusted, to obtain a desired virtual figure.

It is to be noted that in some embodiments, the virtual figure may be associated with a service status of the object. That is, different forms or postures of the virtual figure may be used for representing different service statuses of the corresponding object. The service status may be a login status of the object on the application client, may be set independently by the object, and includes but is not limited to an online state, an offline state, a busy state, a gaming state, a resting state, an invisible state, and the like. For example, a current service status of the object A may be the online state, and in this case, the displayed virtual FIG. 20a may be in a form of standing facing straight ahead. A current service status of the object B may be the resting state, and in this case, the displayed virtual FIG. 20b may be in a form of sleeping. It is to be understood that when the service status of the object changes, the virtual figure of the object changes.

As shown in FIG. 2, the conversation interface 201 may further include a message display region 201b. A conversation message (that is, a historical conversation message, for example, a conversation message 201d) generated in the conversation between the object A and the object B may be displayed in the message display region 201b. In some embodiments, in the message display region 201b, a conversation message with an early transmission timestamp may be displayed before a conversation message with a late transmission timestamp. The object A may trace the historical conversation message through a browsing operation (for example, a swipe operation) on the message display region 201b. Further, the user terminal 20A may generate, based on the trigger operation on the conversation interface 201, the conversation message (for example, the first conversation message) for transmission to the object B, and display the conversation message in the message display region 201b of the conversation interface 201. The conversation interface 201 may further include a message entry control bar 201c. The message entry control bar 201c may include one or more message entry controls, for example, a text entry control, a status display control, and a voice control. Corresponding information may be input by using the message entry controls, thereby generating a conversation message required to be transmitted. For example, text information (for example, text information "OK") may be input by using the text entry control. For another example, image data required to be transmitted (for example, a sticker) may be selected by using the status display control. In some embodiments, the conversation message may be generated in a non-control manner. For example, historical image data (for example, a used sticker) displayed on the conversation interface may be used as a conversation message required to be transmitted. A generation manner for the conversation message is not limited in some embodiments of the disclosure.

It is to be understood that when a conversation message carries object media data associated with a specific object, a virtual figure of the object may be updated based on the object media data. A conversation message 201e transmitted by the object A is used as an example. The conversation message 201e carries object media data (for example, the first object media data) associated with the object A, for example, a smiley sticker (which is image data), and the object media data may be used for representing the object status of the object A in the conversation. For example, the smiley sticker represents happiness. Therefore, after transmission of the conversation message 201e is triggered, the user terminal 20A may display the conversation message 201e in the message display region 201b of the conversation interface 201 (it is to be understood that the two conversation interfaces 201 shown in FIG. 2 are conversation interfaces of the user terminal 20A at different moments). In addition, the user terminal 20A may update the virtual FIG. 20a based on the object media data in the conversation message 201e to obtain a virtual FIG. 201f (that is, the first virtual update figure) matching the object media data, and update the virtual FIG. 20a to the virtual FIG. 201f in the virtual figure display region 201a including the virtual FIG. 20b. As shown in FIG. 2, the virtual FIG. 20a may be updated with the smiley sticker in the conversation message 201e, and the updated virtual FIG. 201f also presents a smiling face. In some embodiments, the object media data carried in the conversation message 201e may further be displayed in the virtual figure display region 201a. For example, the smiley sticker may be displayed in a region adjacent to the virtual FIG. 201f (that is, around the virtual FIG. 201f). It is to be understood that the object media data associated with the object A may in some embodiments be another type of data, for example, text data or voice data, and may also affect the virtual figure of the object A. In some embodiments of the disclosure, image data is used merely as an example for description. For a specific process of updating the virtual figure based on another type of data, refer to the following embodiment corresponding to FIG. 3.

In addition, the user terminal 20A may transmit the conversation message input by the object A to the server 20C. After receiving the conversation message, the server 20C forwards the conversation message to the user terminal 20B (that is, the second terminal). The user terminal 20B may also update the virtual figure of the object A based on the object media data that is carried in the conversation message and that is associated with the object A. The conversation message 201e is still used as an example. As shown in FIG. 2, a conversation interface 202 is a conversation interface (which may also be referred to as a second conversation interface) on the user terminal 20B for the conversation between the object B and the object A. An interface structure of the conversation interface 202 is the same as that of the conversation interface 201 displayed on the user terminal 20A. The conversation interface 202 includes a virtual figure display region 202a and a message display region 202b. The virtual figure display region 202a may display the virtual figure of the object B and the virtual figure of the object A. The message display region 202b may display the historical conversation message. After receiving the conversation message 201e transmitted by the user terminal 20A, the application client on the user terminal 20B may display the conversation message 201e in the message display region 202b of the conversation interface 202. Since the conversation message 201e carries the object media data (for example, the smiley sticker) associated with the object A, the user terminal 20B may update the virtual FIG. 20a based on the object media data in the conversation message 201e to obtain the virtual FIG. 201f matching the object media data, and update the original virtual FIG. 20a of the object A to the virtual FIG. 201f in the virtual figure display region 202a including the virtual FIG. 20b. In some embodiments, the object media data carried in the conversation message 201e may further be displayed in the virtual figure display region 202a. For example, the smiley sticker may be displayed in a region adjacent to the virtual FIG. 201f (that is, around the virtual FIG. 201f).

It is to be understood that when the object B transmits a conversation message to the object A, that is, when the user terminal 20B is a transmission terminal, and the user terminal 20A is a receiving terminal, an interaction process between the user terminal 20B and the user terminal 20A may be the same as the foregoing interaction process. That is, the user terminals on both sides may display, in the message display regions of the corresponding conversation interfaces, the conversation message (that is, a third conversation message) transmitted by the object B to the object A, and update, in the corresponding virtual figure display regions, the virtual figure (for example, the virtual FIG. 20b) of the object B based on object media data (that is, the second object media data) that is carried in the conversation message and that is associated with the object B. A specific process is not elaborated.

It can be seen from the above that in some embodiments of the disclosure, a conversation display mode may be enriched based on a virtual figure, and in addition, a historical conversation message may be recorded and displayed normally in a virtual-figure-based conversation scene.

Figure 3:
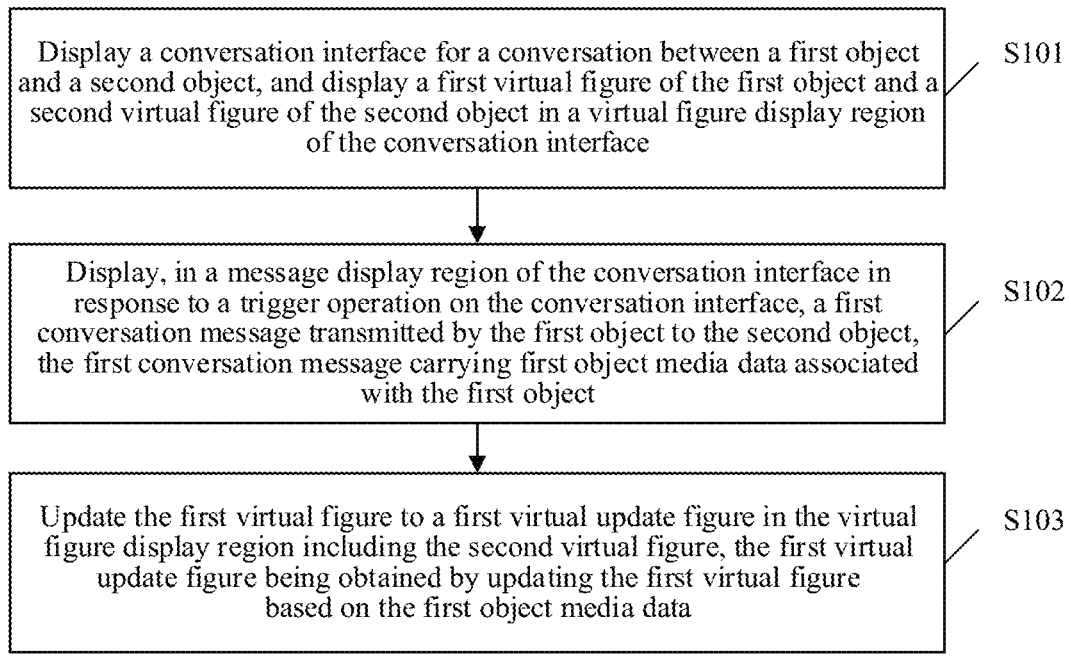
FIG. 3 is a schematic flowchart of a virtual-figure-based data processing method according to some embodiments of the disclosure.

Refer to FIG. 3. FIG. 3 is a schematic flowchart of a virtual-figure-based data processing method according to some embodiments of the disclosure. The data processing method may be performed by a computer device. The computer device may include the user terminal or server shown in FIG. 1. In some embodiments of the disclosure, a user terminal corresponding to a first object is referred to as a first terminal (for example, the user terminal 200a), and a user terminal corresponding to a second object is referred to as a second terminal (for example, the user terminal 200b). The first terminal or the second terminal may be a transmission terminal or a receiving terminal. For ease of understanding, an example in which the method is performed by the first terminal is used for description in some embodiments. The data processing method may include at least the following operation S101 to operation S103:

Operation S101: Display a conversation interface for a conversation between the first object and the second object, and display a first virtual figure of the first object and a second virtual figure of the second object in a virtual figure display region of the conversation interface.

Specifically, the first terminal may display the conversation interface for the conversation between the first object and the second object. The conversation interface corresponding to a conversation structure provided in some embodiments of the disclosure focuses more on virtual figures. Therefore, a partial virtual figure for representing the first object may be used as the first virtual figure of the first object, and a partial virtual figure for representing the second object may be used as the second virtual figure of the second object. The first virtual figure and the second virtual figure are displayed in the virtual figure display region of the conversation interface. The partial virtual figure may be understood as a partial virtual figure in a complete virtual figure (for example, an upper body of the complete virtual figure). For example, refer again to the conversation interface 201 in the embodiment corresponding to FIG. 2. The virtual FIG. 20a of the object A displayed in the virtual figure display region 201a of the conversation interface 201 may be the first virtual figure, and the virtual FIG. 20b of the object B may be the second virtual figure. It can be seen that in this case, the virtual FIG. 20a is a partial virtual figure of the object A, and the virtual FIG. 20b is a partial virtual figure of the object B.

In some embodiments, a complete virtual figure for representing the first object may be used as the first virtual figure of the first object, and a complete virtual figure for representing the second object may be used as the second virtual figure of the second object. The first virtual figure and the second virtual figure are displayed in the virtual figure display region of the conversation interface. It may be understood that a display size of the virtual figure display region of the conversation interface is small, so that a display size of the complete virtual figure displayed in the virtual figure display region is also small.

It is to be understood that the virtual figure display region (for example, the virtual figure display region 201a in FIG. 2) may be displayed in any region of the conversation interface (for example, the conversation interface 201 in FIG. 2) in a form of a floating window, in a form of a mask layer, or in a semitransparent form. For example, the virtual figure display region is a top region of the conversation interface. In some embodiments, the virtual figure display region may be displayed by using a scalable interface whose display size may be changed through a trigger operation (for example, a dragging operation), and the interface is smaller than the conversation interface.

In addition, the conversation interface further includes a message display region configured to display a historical conversation message. The historical conversation message is a recorded conversation message in the conversation between the first object and the second object. The historical conversation message may be displayed in the message display region in a popover form or another form. For example, refer to the message display region 201b of the conversation interface 201 in the embodiment corresponding to FIG. 2. In some embodiments, message transmission information associated with the historical conversation message may further be displayed in the message display region, for example, a transmission timestamp or transmission object information (for example, an avatar or an object name of a transmission object) corresponding to the historical conversation message. It is to be understood that the message display region may be displayed in any region of the conversation interface in the form of a floating window, in the form of a mask layer, or in the semitransparent form. For example, the message display region is a bottom region of the conversation interface. The virtual figure display region and the message display region may not overlap. In some embodiments, the virtual figure display region and the message display region may partially overlap. In some embodiments, the message display region may be displayed by using a scalable interface whose display size may be changed through a trigger operation (for example, a dragging operation), and the interface is smaller than the conversation interface.

Some embodiments of the disclosure also provide a novel conversation interface, referred to as a conversation update interface. The first object and the second object may conduct the conversation by using the conversation update interface. The first terminal may be conveniently switched between the two conversation interfaces anytime according to an operation of the first object. A specific process may be as follows: the first terminal may hide the message display region on the conversation interface in response to a hiding operation on the message display region, and determine a display interface on which the virtual figure display region is as the conversation update interface. In this case, the hidden message display region may be arranged in a bottom layer of the conversation interface. In some embodiments, the message display region may be hidden through downward extension. A specific hiding manner of the message display region is not limited in some embodiments of the disclosure. Further, the first terminal may update the first virtual figure on the conversation update interface from the partial virtual figure of the first object to the complete virtual figure of the first object, and update the second virtual figure from the partial virtual figure of the second object to the complete virtual figure of the second object. The complete virtual figure may be a virtual figure of an entire body or a virtual figure fused with a virtual background.

In some embodiments, if the virtual figure originally displayed in the virtual figure display region is the complete virtual figure, after the conversation interface is switched to the conversation update interface, the first terminal may scale up and display the complete virtual figure in the virtual figure display region. That is, a display size of the complete virtual figure displayed in the virtual figure display region of the conversation interface is smaller than that of the complete virtual figure displayed on the conversation update interface.

It is to be understood that a message display mode of the conversation update interface slightly differs from that of the conversation interface. In some embodiments, in the conversation between the first object and the second object, if the first object transmits a second conversation message to the second object, the second conversation message may be displayed on the conversation update interface. In some embodiments, the second conversation message may be displayed in a region adjacent to the complete virtual figure of the first object, or in another region associated with the first object on the conversation update interface. A display position of the second conversation message on the conversation update interface is not limited in this embodiment of the disclosure.

In some embodiments, the second conversation message may be displayed in the popover form, a scrolling form, or another form. A specific display form of the second conversation message on the conversation update interface is not limited in this embodiment of the disclosure.

In some embodiments, a corresponding message display threshold may be set for the conversation message displayed on the conversation update interface, to avoid interference to presentation of a subsequent new conversation message. For example, when display duration of the second conversation message is equal to the message display threshold, the first terminal may hide or delete the second conversation message on the conversation update interface. Therefore, the conversation message displayed on the conversation update interface is always a latest conversation message, that is, a conversation message with a latest transmission timestamp. It is to be understood that the second conversation message may still be recorded as a historical conversation message. That is, when the first terminal is switched back to the original conversation interface, the second conversation message may still be displayed on the conversation interface. That is, the transmitted conversation message is traceable. A specific value of the message display threshold is not limited in this embodiment of the disclosure.

Figure 4:
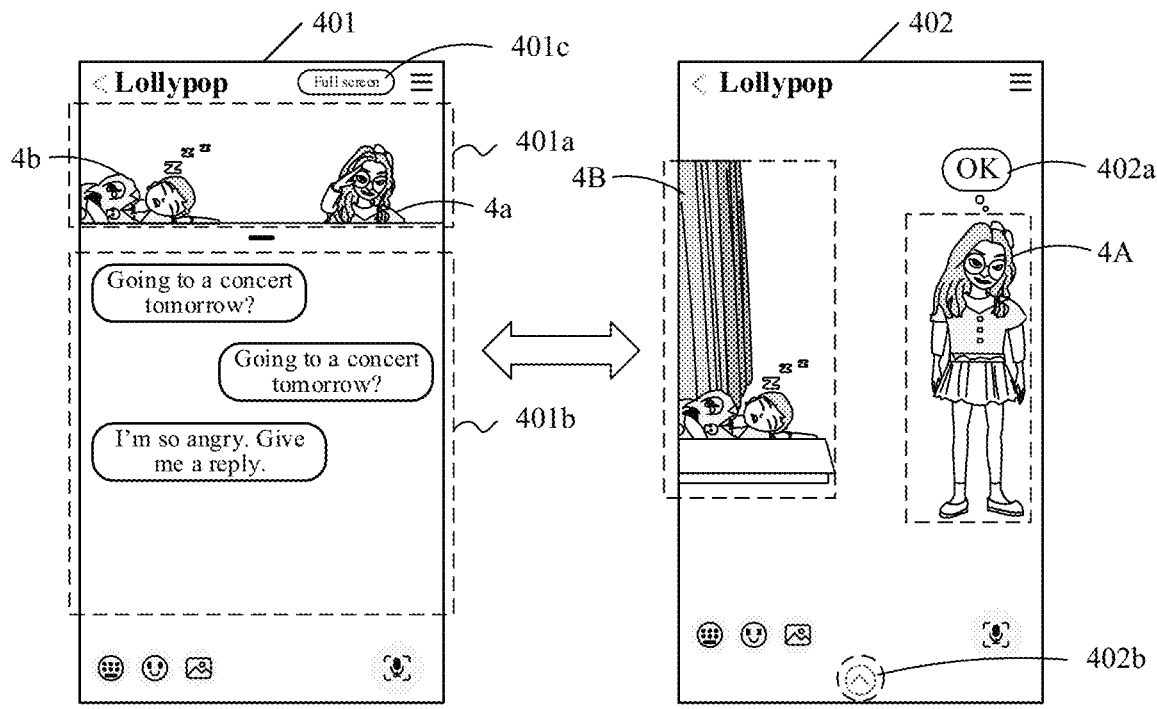
FIG. 4 is a schematic diagram of a conversation interface according to some embodiments of the disclosure.

For ease of understanding, refer to FIG. 4 together. FIG. 4 is a schematic diagram of the conversation interface according to some embodiments of the disclosure. As shown in FIG. 4, a conversation interface 401 includes a virtual figure display region 401a and a message display region 401b. In the virtual figure display region 401a, the partial virtual figure (that is, the first virtual figure) of the object A (that is, the first object), for example, a virtual FIG. 4a, may be displayed, and the partial virtual figure (that is, the second virtual figure) of the object B (that is, the second object), for example, a virtual FIG. 4b, may also be displayed. When switching to another conversation interface is desired, the first terminal may respond to a hiding operation on the message display region 401b. For example, the hiding operation may be a swipe operation (for example, the message display region 401b is pulled down). In some embodiments, the conversation interface 401 may include a region hiding control 401c. Therefore, the message display region 401b may be hidden on the conversation interface 401 in response to a trigger operation (for example, a tap operation) on the region hiding control 401c, to switch the conversation interface 401 to a conversation update interface 402 and update the virtual FIG. 4a and the virtual FIG. 4b. Further, as shown in FIG. 4, on the conversation update interface 402, the virtual FIG. 4a is updated to a virtual FIG. 4A, that is, a complete virtual figure of the object A, and in addition, the virtual FIG. 4b is updated to a virtual FIG. 4B, that is, a complete virtual figure of the object B. When the object A transmits a new conversation message (that is, the second conversation message, for example, a conversation message 402a) to the object B, the first terminal may display the conversation message on the conversation update interface 402. For example, when the object A transmits the conversation message 402a to the object B, the conversation message 402a may be displayed in an appropriate form (for example, a popover) in a region adjacent to the virtual FIG. 4A displayed on the conversation update interface 402 (for example, over the head of the virtual FIG. 4A), to indicate that the conversation message 402a is transmitted by the object A.

Further, if the first object wants switching back to the conversation interface, the first terminal may display the message display region on the conversation update interface in response to a trigger operation on the conversation update interface, and further determine the display interface on which the message display region is as the conversation interface. On the conversation interface, the first virtual figure may be recovered from the complete virtual figure of the first object to the partial virtual figure of the first object, and the second virtual figure may be recovered from the complete virtual figure of the second object to the partial virtual figure of the second object. In addition, the second conversation message received before may be displayed in the message display region. As shown in FIG. 4, the first terminal may respond to a trigger operation on the conversation update interface 402. For example, the trigger operation may be a swipe operation (for example, the conversation update interface 402 is pulled up). In some embodiments, the conversation update interface 402 may include a region display control 402b. The message display region may be displayed on the conversation update interface 402 in response to a trigger operation (for example, a tap operation) on the region display control 402b, to switch the conversation update interface 402 back to the conversation interface 401 and update the virtual FIG. 4A and the virtual FIG. 4B.

In some embodiments, the first virtual figure and the second virtual figure may further be used for representing service statuses of the corresponding objects, for example, an online state, an offline state, a busy state, a gaming state, a resting state, or an invisible state. That is, different service statuses may correspond to different forms/postures of the virtual figure. For example, the virtual FIG. 4b shown in FIG. 4 is in a sleeping form, and it may indicate that the service status of the corresponding object B is the resting state. Therefore, the first terminal may obtain a corresponding virtual figure according to a figure resource identifier and a service status of each object, to display the virtual figure on the conversation interface. For a specific process, refer to operation S201 in the following embodiment corresponding to FIG. 10.

Operation S102: Display, in the message display region of the conversation interface in response to a trigger operation on the conversation interface, a first conversation message transmitted by the first object to the second object, the first conversation message carrying first object media data associated with the first object.

Specifically, the first terminal may generate, in response to the trigger operation on the conversation interface, the first conversation message transmitted by the first object to the second object, and display the first conversation message in the message display region of the conversation interface.

In some embodiments, the first object media data carried in the first conversation message may include first-type image data. That is, the first terminal may determine, in response to the trigger operation on the conversation interface, the first-type image data for representing an object status of the first object in the conversation, further determine the first-type image data as the first object media data associated with the first object, generate, based on the first object media data, the first conversation message for transmission to the second object, and display the first conversation message (for example, the conversation message 201e in FIG. 2) in the message display region of the conversation interface. The first-type image data may be image data that is input by the first object and that is used for representing the object status of the first object, for example, a sticker. In some embodiments, in addition to the first object media data, the first conversation message may include text data entered by the first object or other image data (for example, a landscape photo) unrelated to the object status of the first object. That is, the first conversation message may include one or more types of data.

Some embodiments of the disclosure provide a plurality of manners for determining the first-type image data. The first object may use any one of the manners specifically as follows.

Figure 5:
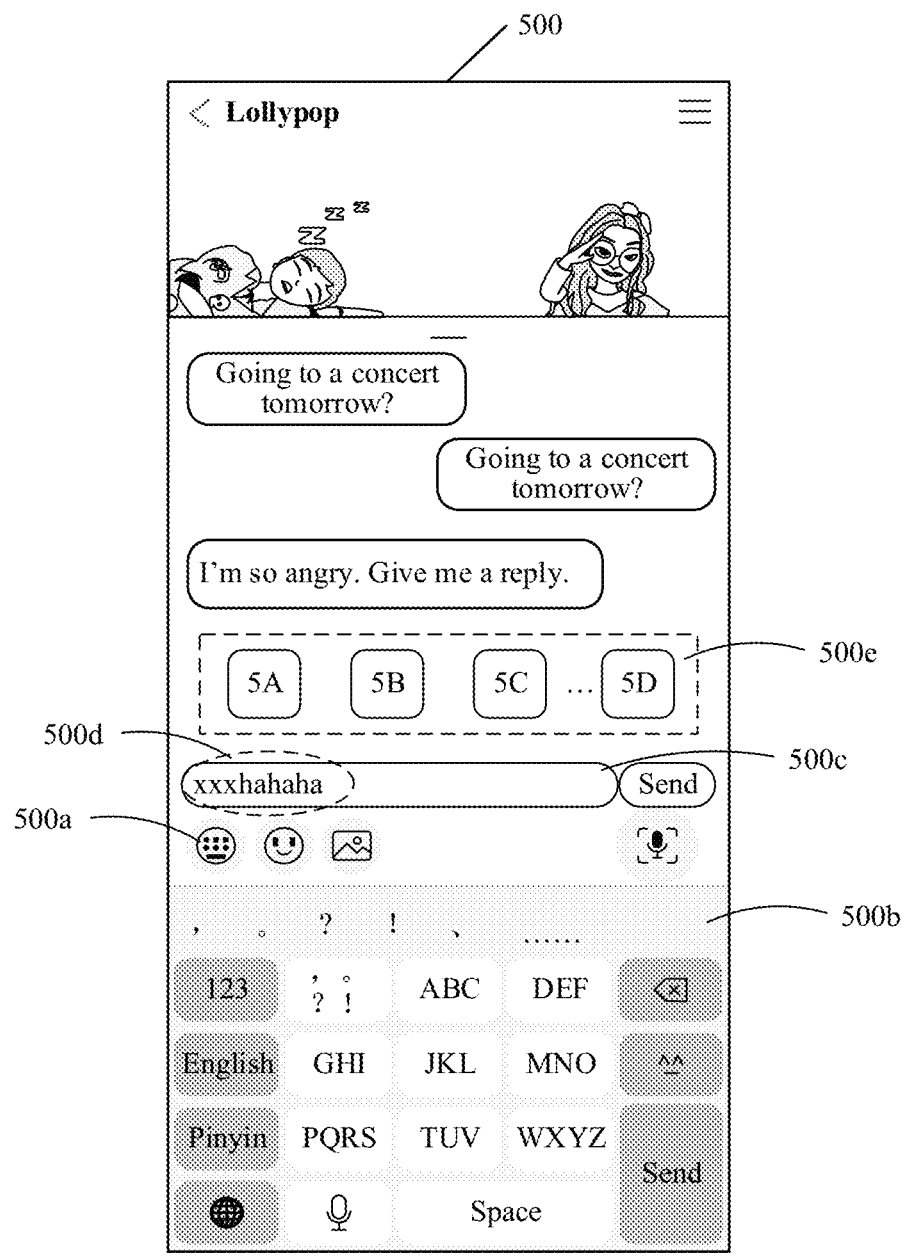
FIG. 5 is a schematic diagram of a scene in which image data is determined according to some embodiments of the disclosure.

In some implementations, the first terminal may display, in response to a trigger operation on a text entry control on the conversation interface, text information entered by using the text entry control, and display, in response to detecting that the text information carries a status mapping text, the first-type image data that is mapped by the status mapping text and that is used for representing the object status of the first object in the conversation. The status mapping text is a text capable of mapping a specific object status. The status mapping text has a mapping relationship with the first-type image data. For example, a text "Hahaha" may be determined as a status mapping text with a mapping relationship with a "laugh" sticker. Refer to FIG. 5 together. FIG. 5 is a schematic diagram of a scene in which image data is determined according to some embodiments of the disclosure. As shown in FIG. 5, a conversation interface 500 includes a text entry control 500a. A text entry region 500b is output on the conversation interface 500 in response to a trigger operation (for example, a tap operation or a touch-and-hold operation) on the text entry control 500a. Further, in response to a text entry operation on the text entry region 500b, text information 500d entered through the text entry operation may be displayed in a text input box 500c. During this time, the first terminal may perform text detection on the text information 500d. When detecting that the text information 500d includes the status mapping text (for example, "Hahaha"), the first terminal may display a first image list 500e mapped by the status mapping text on the conversation interface 500. The first image list 500e may include one or more pieces of image data, for example, image data 5A, image data 5B, image data 5C, . . . , and image data 5D.

Therefore, the first object may determine the first-type image data required by the first object from the first image list 500e. For example, the first terminal may determine, in response to a selection operation performed by the first object on the one or more pieces of image data in the first image list 500e, image data corresponding to the selection operation as the first-type image data for representing the object status of the first object. For example, the image data 5A may be selected as the first-type image data. In some embodiments, the one or more pieces of image data are all determined as the first-type image data. In some embodiments, the first terminal may automatically select any one of the one or more pieces of image data as the first-type image data. For example, image data collected by most persons in the first image list 500e may be selected as the first-type image data.

In some embodiments, when the first object wants to transmit only a pure text conversation message, although the text information entered by the first object carries the status mapping text, and the image data mapped by the status mapping text is displayed on the conversation interface, the first object may not select the image data but determine the text information carrying the status mapping text as the first conversation message. In this case, the first terminal may automatically select one piece of image data from the image data mapped by the status mapping text as the first-type image data, for example, randomly select from a plurality of pieces of image data or select based on a heat priority, and then associate the first-type image data with the first conversation message. It is to be understood that the first-type image data is not displayed in the message display region together with the first conversation message, but the first terminal may still update the first virtual figure based on the "implicit" first-type image data.

Figure 6:
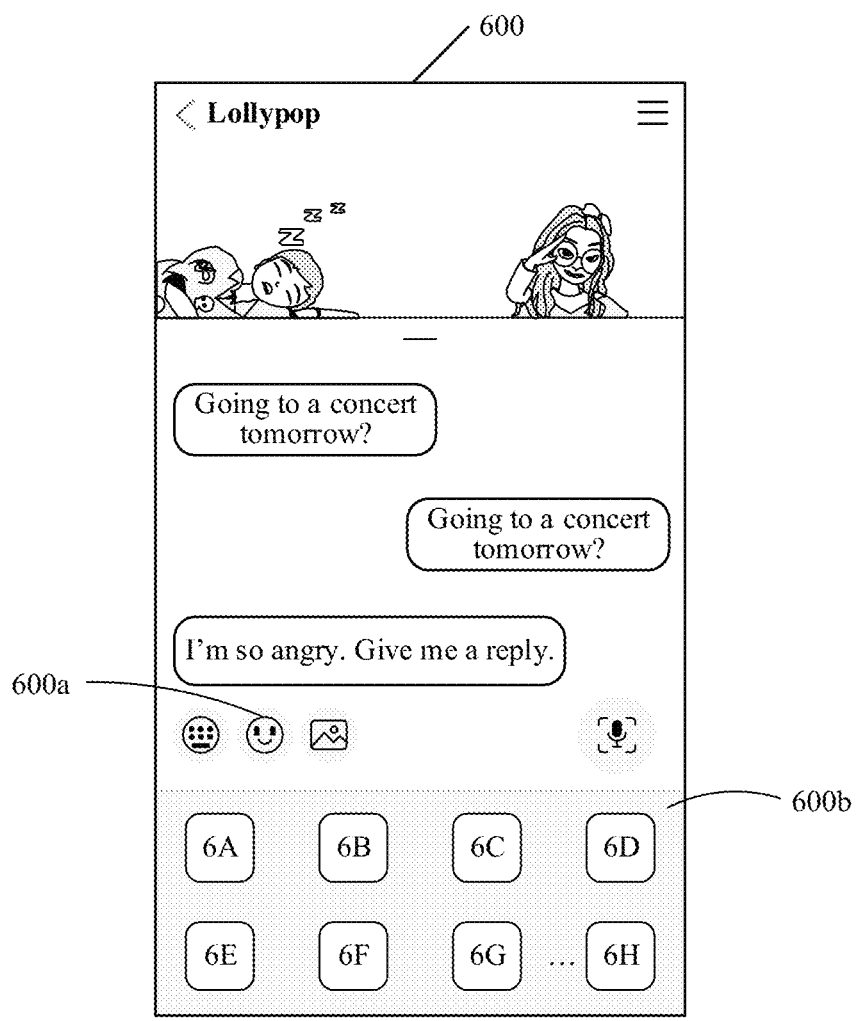
FIG. 6 is a schematic diagram of a scene in which image data is selected according to some embodiments of the disclosure.

In some implementations, the first terminal may output, in response to a trigger operation on a status display control on the conversation interface, an image selection panel associated with the status display control, and further determine, in response to a selection operation on the image selection panel, image data corresponding to the selection operation as the first-type image data for representing the object status of the first object in the conversation. Refer to FIG. 6 together. FIG. 6 is a schematic diagram of a scene in which image data is selected according to some embodiments of the disclosure. As shown in FIG. 6, a conversation interface 600 includes a status display control 600a. The first terminal may output an image selection panel 600b on the conversation interface 600 in response to a trigger operation (for example, a tap operation) on the status display control 600a. The image selection panel 600b may include one or more pieces of image data, for example, image data 6A, image data 6B, image data 6C, . . . , and image data 6H. The image data may be one or more of image data (that is, historical image data) that has been used by the first object, image data collected by the first object, image data shared by another object to the first object, and image data recommended by the first terminal. Further, the first terminal may determine, in response to a selection operation performed by the first object on the one or more pieces of image data in the image selection panel 600b, image data corresponding to the selection operation as the first-type image data. For example, the image data 6C may be selected as the first-type image data.

Figure 7:
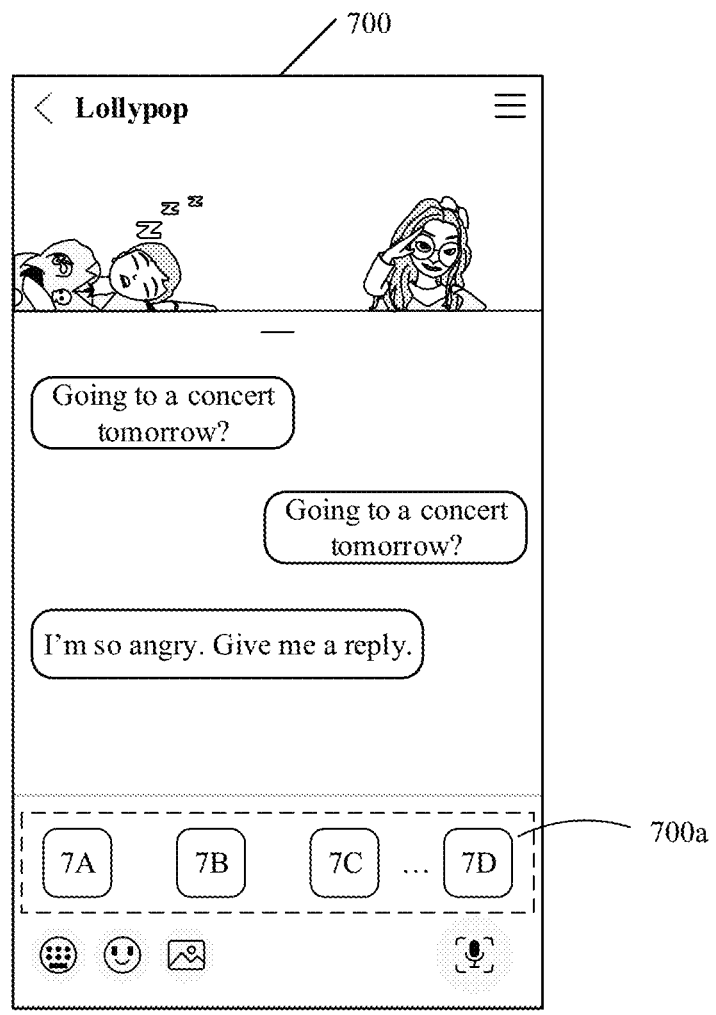
FIG. 7 is a schematic diagram of a scene in which image data is determined according to some embodiments of the disclosure.

In some implementations, the first terminal may determine, in response to a determining operation on target image data on the conversation interface, the target image data as the first-type image data for representing the object status of the first object in the conversation. Refer to FIG. 7. FIG. 7 is a schematic diagram of a scene in which image data is determined according to some embodiments of the disclosure. As shown in FIG. 7, a second image list 700a may be directly displayed on a conversation interface 700. The second image list 700a may include one or more pieces of image data for the first object to select. For example, the second image list 700a may include image data 7A, image data 7B, image data 7C, . . . , and image data 7D. The image data may be image data (that is, historical image data) that has been used by the first object, image data collected by the first object, image data shared by another object to the first object, or image data recommended by an image system, for example, image data recommended based on heat ranking or a portrait of the first object. The first object may determine the target image data (for example, the image data 7B) from the one or more pieces of image data in the second image list 700a, and determine the target image data as the first-type image data.

In some embodiments, the first object media data carried in the first conversation message may include second-type image data. That is, the first terminal may invoke, in response to the trigger operation on the conversation interface during entry of voice information by the first object by using a voice control, a camera to capture object image data of the first object. The object image data herein is data for recording a facial expression, a body movement, or the like of the first object, and is a real image of the first object in a process of entering the voice information. For example, the first terminal may determine video data obtained by shooting the first object as the object image data. It is to be understood that the camera is turned on only after a permission granted by the first object is obtained. Correspondingly, the object image data is data that may be obtained by the camera only after a permission granted by the first object is obtained.

Further, the first terminal may adjust, based on the object image data is captured, a figure status of the first virtual figure based on the object image data, and generate, based on a first virtual figure in an adjusted figure status, the second-type image data for representing the object status of the first object in the conversation. The second-type image data is obtained based on the first virtual figure in the adjusted figure status, and is associated with the object image data of the first object captured by the camera. For example, the body movement and the facial expression of the first object when speaking may be captured and fed back to the first virtual figure. That is, the first virtual figure may change with the body movement or the facial expression of the first object. In addition, a changing process of the first virtual figure may be recorded to obtain a video. Finally, the video may be converted into corresponding image data (for example, a dynamic image). The image data is determined as the second-type image data. That is, the virtual figure of the first object is converted into a sticker for final transmission to the second object together with the voice information. Therefore, diversity of voice interaction may be improved. A specific process may be as follows: performing, based on the object image data is captured, status detection on the object image data, determining a detected status as the object status of the first object in the conversation, further obtaining the first virtual figure, adjusting the figure status of the first virtual figure based on the object status, and generating, based on the first virtual figure in the adjusted figure status, the second-type image data for representing the object status. The figure status of the first virtual figure may include a body movement or a facial expression of the first virtual figure. For example, when it is detected that the first object is smiling, the facial expression of the first virtual figure may be adjusted to be a smile.

Further, the first terminal may integrate the generated second-type image data and the voice information to obtain the first object media data associated with the first object. A specific process may be as follows: uploading the second-type image data to a server, obtaining, based on the second-type image data is successfully uploaded, an image resource identifier corresponding to the second-type image data, uploading the voice information to the server simultaneously, obtaining, based on the voice information is successfully uploaded, a voice resource identifier corresponding to the voice information, and further integrating the second-type image data carrying the image resource identifier and the voice information carrying the voice resource identifier, or binding the second-type image data and the voice information based on the image resource identifier and the voice resource identifier, to obtain the first object media data associated with the first object.

Further, the first terminal may generate, based on the first object media data, the first conversation message for transmission to the second object. A specific process may be as follows: performing voice conversation processing on the voice information to obtain converted text information corresponding to the voice information, displaying the converted text information in an image capturing region configured to capture the object image data, and integrating the converted text information and the first object media data to obtain the first conversation message for transmission to the second object. Finally, the first conversation message may be displayed in the message display region of the conversation interface.

In some embodiments, the first terminal may determine, based on the object image data is not captured, third-type image data based on the first virtual figure, further integrate the third-type image data and the voice information to obtain the first object media data associated with the first object, and then generate, based on the first object media data, the first conversation message for transmission to the second object. The third-type image data is obtained based on the original first virtual figure. For example, the first virtual figure may be directly determined as the third-type image data. In some embodiments, the specific virtual figure (for example, a virtual figure in a specific form) mapped by the first virtual figure may be determined as the third-type image data by default. That is, when the object image data is not captured, the virtual figure may be determined as default third-type image data. A process in which the first object media data is generated based on the third-type image data and the first conversation message is further generated is similar to the foregoing process in which the first object media data is generated based on the second-type image data and the first conversation message is further generated, and will not be elaborated herein.

Figure 8:
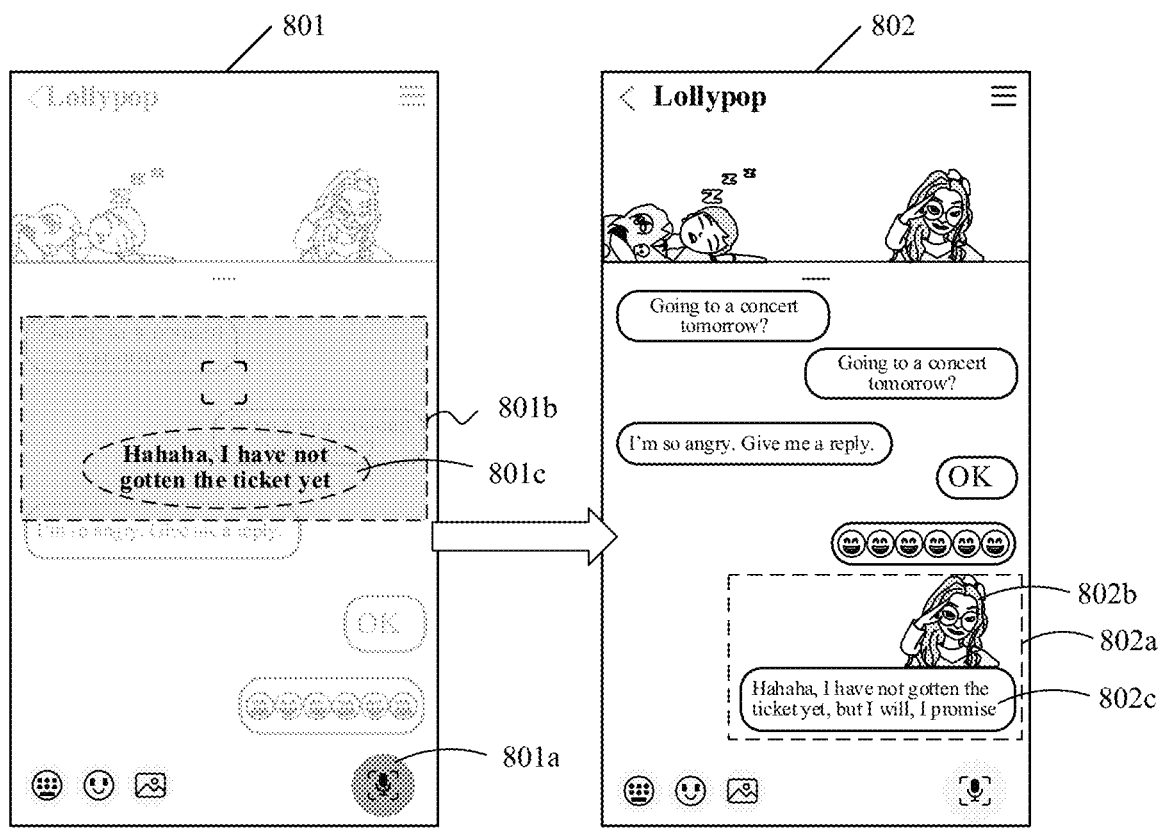
FIG. 8 is a schematic diagram of a scene in which voice information is entered according to some embodiments of the disclosure.

Refer to FIG. 8 together. FIG. 8 is a schematic diagram of a scene in which the voice information is entered according to some embodiments of the disclosure. As shown in FIG. 8, a conversation interface 801 may include a voice control 801a. The first terminal may output, in response to a trigger operation (for example, a touch-and-hold operation) on the voice control 801a, an image capturing region 801b configured to capture the object image data of the first object. In addition, when the first object enters the voice information by using the voice control 801a, converted text information 801c converted from the voice information is displayed synchronously in the image capturing region 801b. It is to be understood that the camera may keep capturing the object image data of the first object in the process of entering the voice information. If the object image data is not captured, only the converted text information 801c may be displayed in the image capturing region 801b. In some embodiments, if the object image data is not captured, the third-type image data may be displayed in the image capturing region 801b. It may be understood that the third-type image data displayed in this case is unrelated to the object image data, so that the third-type image data may not change with the first object. As shown in FIG. 8, after voice entry is ended (for example, the first object releases the voice control 801a to end the touch-and-hold operation), the image capturing region 801b may be hidden to return to a conversation interface 802, and a finally generated conversation message 802a (that is, the first conversation message) for transmission to the second object may be displayed in a message display region of the conversation interface 802. It can be seen that the conversation message 802a includes first object media data 802b and converted text information 802c (that is, the converted text information 801c).

Figure 9:
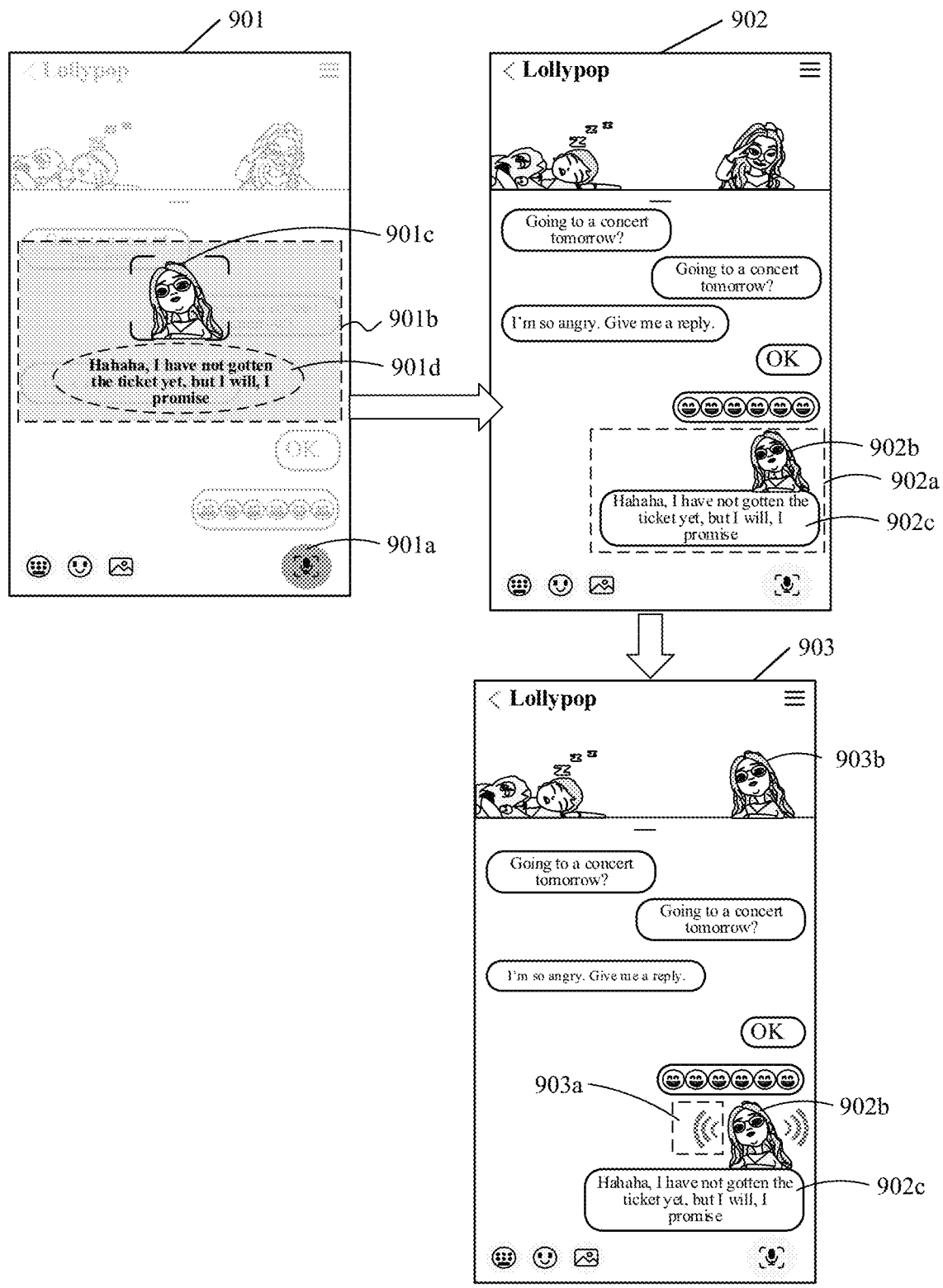
FIG. 9 is a schematic diagram of a scene in which voice information is entered according to some embodiments of the disclosure.

Refer to FIG. 9 together. FIG. 9 is a schematic diagram of a scene in which the voice information is entered according to some embodiments of the disclosure. As shown in FIG. 9, the first terminal may output, in response to a trigger operation (for example, a touch-and-hold operation) on a voice control 901a on a conversation interface 901, an image capturing region 901b configured to capture the object image data of the first object, and further display, when the first object enters the voice information by using the voice control 901a, converted text information 901d converted from the voice information synchronously in the image capturing region 901b. In addition, if the object image data is captured in the process of entering the voice information, for example, the face of the first object faces the camera, second-type image data 901c may further be displayed in the image capturing region 901b. It may be understood that the second-type image data 901c displayed in this case is related to the object image data, and may be used for representing the object status (for example, the facial expression or the body movement) of the first object in the conversation. As shown in FIG. 9, after voice entry is ended (for example, the first object releases the voice control 901a to end the touch-and-hold operation), the image capturing region 901b may be hidden to return to a conversation interface 902, and a finally generated conversation message 902a (that is, the first conversation message) for transmission to the second object may be displayed in a message display region of the conversation interface 902. It can be seen that the conversation message 902a includes first object media data 902b and converted text information 902c (that is, the converted text information 901d).

The image capturing region may be displayed in any region of the conversation interface in the form of a floating window, in the form of a mask layer, or in the semitransparent form. In some embodiments, the image capturing region may be displayed by using a scalable interface whose display size may be changed through a trigger operation (for example, a dragging operation), and the interface may be smaller than the conversation interface.

It is to be noted that the first terminal may play the voice information in response to a trigger operation on the first object media data carried in the first conversation message, and display, on the conversation interface, a sound effect animation associated with the voice information. In addition, when the voice information is played, the converted text information in the first conversation message may be highlighted synchronously, and the first virtual figure may be updated synchronously with the first object media data. Refer back to FIG. 9. As shown by a conversation interface 903 in FIG. 9, the first terminal may play the voice information corresponding to the converted text information 902c on the conversation interface 903 in response to a trigger operation on the first object media data 902b carried in the conversation message 902a on the conversation interface 903, and simultaneously display a sound effect animation 903a associated with the voice information. The sound effect animation 903a may include an image animation corresponding to the second-type image data 901c carried in the first object media data 902b, and in some embodiments, may further include a pulse animation associated with the voice information, for example, a pulse animation that changes randomly or a pulse animation that changes with a volume corresponding to the voice information. In some embodiments, the converted text information 902c may further be highlighted synchronously. For example, a text in the converted text information 902c may be sequentially highlighted with the played voice information. In addition, a virtual FIG. 903b may be updated synchronously with the first object media data 902b. In this manner, a body movement and a facial expression in the first object media data 902b may be recovered.

Voice conversion processing may be implemented by using a real-time voice translation function of a voice recognition interface. There may be a synchronous logic between the obtained converted text information and the voice information. That is, when the voice information is in a specific playing progress, the first terminal may obtain, according to the voice recognition interface, a text position corresponding to the playing progress in the converted text information. Therefore, the first terminal may highlight a text at the text position according to the text position returned by the voice recognition interface.

It may be understood that when voice playback is ended, the sound effect animation disappears, and a synchronously updated first virtual figure may be recovered to the original first virtual figure. In some embodiments, the updated first virtual figure may remain in a current form, and may be updated again when a new conversation message is generated.

In some embodiments, when switched to the conversation update interface for voice entry, the first terminal may invoke, in response to a trigger operation on the conversation update interface during entry of the voice information by the first object by using a voice control on the conversation update interface, the camera to capture the object image data of the first object, and adjust, in the case that the object image data is captured, the figure status of the first virtual figure based on the object image data. It is to be understood in this case, the first virtual figure is the complete virtual figure of the first object. The first terminal may directly display the first virtual figure in the adjusted figure status in real time on the conversation update interface, and generate, based on the first virtual figure in the adjusted figure status, the second-type image data for representing the object status of the first object in the conversation. For example, an entire process of adjusting the figure status of the first virtual figure is recorded to obtain corresponding video data, and image data converted from the video data may further be determined as the second-type image data. In the case that the object image data is not captured, the third-type image data may be determined based on the first virtual figure displayed on the conversation update interface. In addition, a voice conversion region may be output on the conversation update interface to display in real time converted text information obtained by performing voice conversion processing on the entered voice information. In some embodiments, a complete first conversation message (that is, including the first object media data and text information) may be displayed on the conversation update interface. In some embodiments, to save display space, only text information carried in the first conversation message may be displayed on the conversation update interface, and the first object media data carried in the first conversation message is not required to be displayed. In this case, the corresponding voice information is played in response to a trigger operation on a playing control related to the text information on the conversation update interface. In a playing process, the complete virtual figure of the first object may change synchronously with the first object media data. It is to be understood that the complete first conversation message is still displayed in the message display region of the conversation interface after switching back to the conversation interface.

Operation S103: Update the first virtual figure to a first virtual update figure in the virtual figure display region including the second virtual figure, the first virtual update figure being obtained by updating the first virtual figure based on the first object media data.

Specifically, the first terminal may update the first virtual figure based on the first object media data to obtain the first virtual update figure matching the first object media data, and further update the first virtual figure to the first virtual update figure in the virtual figure display region including the second virtual figure.

In some embodiments, the first terminal may update, based on the first object media data includes the first-type image data, the first virtual figure based on the first-type image data to obtain the first virtual update figure (for example, the virtual FIG. 201f in FIG. 2) matching the first-type image data. A specific process may be as follows: performing media data detection on the first conversation message by using a message manager, generating a status trigger event in response to detecting that the first object media data carried in the first conversation message includes the first-type image data, and transmitting the status trigger event to a virtual figure processor. The status trigger event may include an object identifier of the first object and an image data list. The object identifier may be used for identifying the first object. For example, a user account of the first object may be used as the object identifier of the first object. The image data list is used for recording the first-type image data in the first object media data. Here, there may be one or more pieces of different first-type image data. Further, the first virtual figure associated with the object identifier may be updated based on the first-type image data in the image data list based on the virtual figure processor receives the status trigger event, to obtain the first virtual update figure matching the first-type image data. Both the message manager and the virtual figure processor belong to the application client on the first terminal. Finally, the first terminal may update the first virtual figure to the first virtual update figure in the virtual figure display region including the second virtual figure. In addition, the first-type image data may also be displayed in the virtual figure display region. For example, the first-type image data is displayed in a region adjacent to the first virtual update figure.

In some embodiments, when the first object media data includes the second-type image data, the first virtual figure is updated based on the second-type image data in response to a trigger operation on the first object media data, to obtain the first virtual update figure (for example, the virtual FIG. 903b in FIG. 9) matching the second-type image data.

Further, the first virtual figure is updated to the first virtual update figure in the virtual figure display region including the second virtual figure.

It can be seen from the above that in the process of conducting the conversion by using the conversation interface, the virtual figures of both sides (that is, the first object and the second object) of the conversation may be displayed in the virtual figure display region, and in addition, a conversation message (that is, the historical conversation message, for example, the first conversation message) generated in the conversation may be displayed in the message display region. Therefore, both sides of the conversation may trace the historical conversation message, and normal recording and displaying of the historical conversation message is ensured. That is, in some embodiments of the disclosure, the historical conversation message may be normally recorded and displayed in a virtual-figure-based conversation scene. In addition, the first virtual figure may be updated based on the first object media data carried in the first conversation message, to present the object status of the first object in real time. Therefore, a conversation display mode may be enriched.

Figure 10:
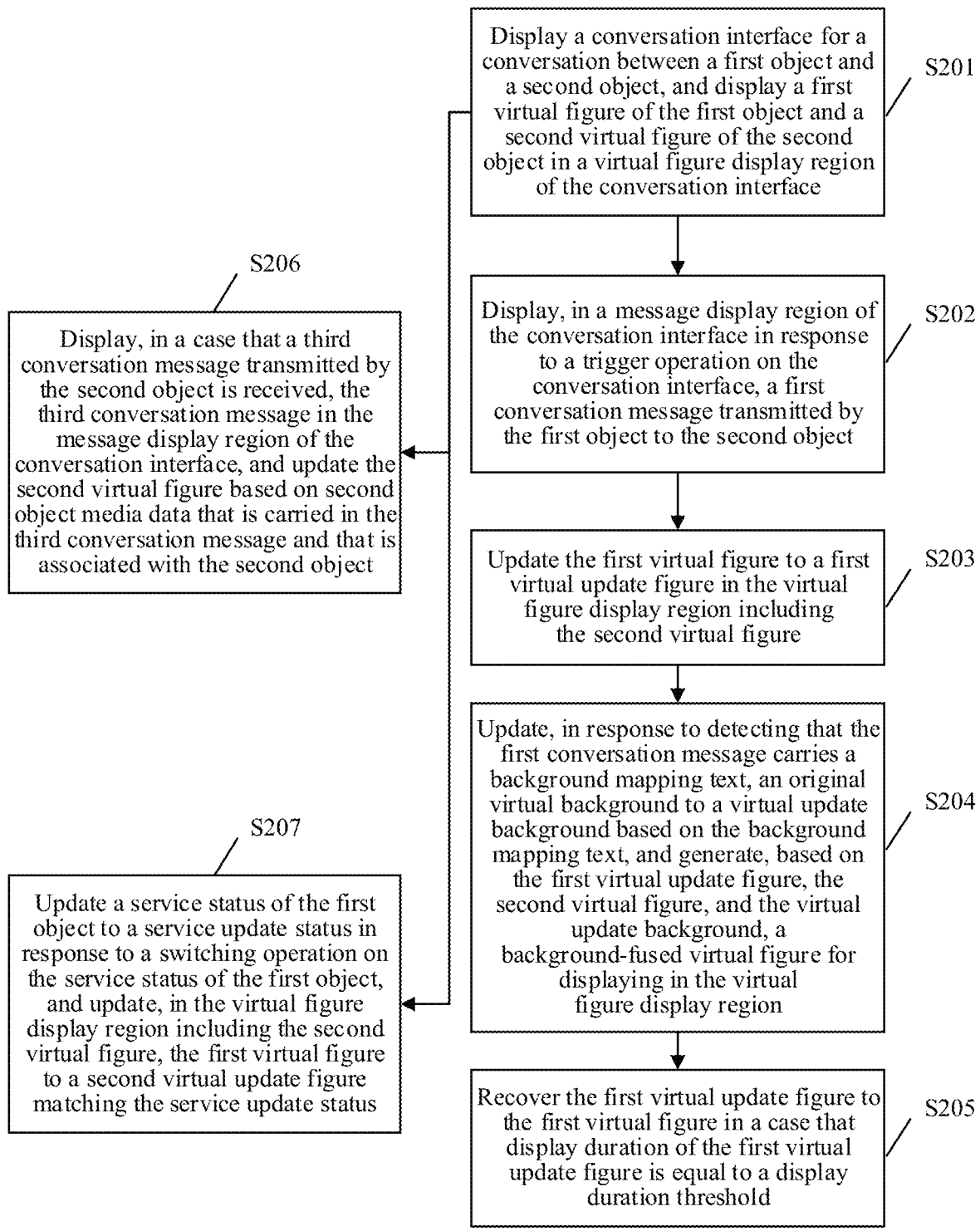
FIG. 10 is a schematic flowchart of a virtual-figure-based data processing method according to some embodiments of the disclosure.

Refer to FIG. 10. FIG. 10 is a schematic flowchart of a virtual-figure-based data processing method according to some embodiments of the disclosure. The data processing method may be performed by a computer device. The computer device may include the user terminal or server shown in FIG. 1. For ease of understanding, an example in which the method is performed by a first terminal (for example, the user terminal 200a) is used for description in this embodiment. The data processing method may include at least the following operations:

Operation S201: Display a conversation interface for a conversation between a first object and a second object, and display a first virtual figure of the first object and a second virtual figure of the second object in a virtual figure display region of the conversation interface.

Specifically, the first terminal may first display the conversation interface for the conversation between the first object and the second object. Further, the first terminal may obtain a corresponding virtual figure based on a figure resource identifier and a service status of each object. A specific process may be as follows: obtaining a first figure resource identifier and a first service status that correspond to the first object, obtaining a second figure resource identifier and a second service status that correspond to the second object, performing figure resource search in a local virtual figure buffer of the first terminal based on the first figure resource identifier and the first service status, and performing figure resource search simultaneously in the virtual figure buffer based on the second figure resource identifier and the second service status. The virtual figure buffer may be configured to locally buffer figure resources. If no virtual figure corresponding to the first object and no virtual figure corresponding to the second object are not found in the virtual figure buffer, a figure resource obtaining request may be generated based on the first figure resource identifier, the first service status, the second figure resource identifier, and the second service status. The figure resource obtaining request is transmitted to a server. The server is configured to generate, based on the first figure resource identifier and the first service status in response to receiving the figure resource obtaining request, a first figure resource address corresponding to the first virtual figure, generate, based on the second figure resource identifier and the second service status, a second figure resource address corresponding to the second virtual figure, and return the first figure resource address and the second figure resource address. The first figure resource identifier and the first service state are obtained after a permission granted by the first object is obtained. The second figure resource identifier and the second service status are also obtained after a permission granted by the second object is obtained.

Further, after receiving the first figure resource address and the second figure resource address that are returned by the server, the first terminal may obtain, based on the first figure resource address, the first virtual figure associated with the first object, obtain, based on the second figure resource address, the second virtual figure associated with the second object, and display the first virtual figure and the second virtual figure in the virtual figure display region of the conversation interface.

The first figure resource address is a storage location of the first virtual figure in a figure resource library associated with the server. The second figure resource identifier is a storage location of the second virtual figure in the figure resource library. Therefore, the first terminal may read the first virtual figure from the storage location indicated by the first figure resource address in the figure resource library, and read the second virtual figure from the storage location indicated by the second figure resource address in the figure resource library.

It is to be understood that if a virtual figure corresponding to a specific object (for example, the first object) has been found from the virtual figure buffer based on a figure resource identifier and a service status of the object, no figure resource obtaining request is required to be initiated to the server. If a virtual figure corresponding to the object is not found from the virtual figure buffer, a figure resource obtaining request is required to be initiated to the server.

In some embodiments, the first virtual figure and the second virtual figure may be obtained respectively. That is, the first terminal may generate a first figure resource obtaining request based on a first figure resource identifier and a first service status, and further transmit the first figure resource obtaining request to a server, such that the server generates, based on the first figure resource identifier and the first service status in response to receiving the first figure resource obtaining request, a first figure resource address corresponding to the first virtual figure, and returns the first figure resource address to the first terminal. In addition, the first terminal may generate a second figure resource obtaining request based on a second figure resource identifier and a second service status, and further transmit the second figure resource obtaining request to the server, such that the server generates, based on the second figure resource identifier and the second service status in response to receiving the second figure resource obtaining request, a second figure resource address corresponding to the second virtual figure, and returns the second figure resource address to the first terminal. The first terminal may obtain, based on the first figure resource address, the first virtual figure associated with the first object, and obtain, based on the second figure resource address, the second virtual figure associated with the second object.

For ease of improving efficiency of subsequently obtaining the virtual figure, after obtaining a specific virtual figure from the figure resource library associated with the server, the first terminal may store the virtual figure in the local virtual figure buffer.

It is to be understood that the virtual figure obtained by the first terminal may be a partial virtual figure or a complete virtual figure. In some embodiments, a partial virtual figure and a complete virtual figure of a same object may have a same figure resource identifier. Therefore, the first terminal may first obtain the corresponding complete virtual figure, further crop the complete virtual figure to obtain the corresponding partial virtual figure, and allocate the same figure resource identifier to the complete virtual figure and the corresponding partial virtual figure. In some embodiments, a partial virtual figure and a complete virtual figure of a same object may have different figure resource identifiers. That is, the first terminal may allocate different figure resource identifiers to a complete virtual figure and a partial virtual figure obtained by cropping the complete virtual figure, and store the complete virtual figure and the corresponding partial virtual figure in a binding manner based on the figure resource identifiers of the complete virtual figure and the partial virtual figure. Therefore, the first terminal may quickly obtain, based on the figure resource identifier of the complete virtual figure, the complete virtual figure and the partial virtual figure corresponding to the complete virtual figure, or the first terminal may quickly obtain, based on the figure resource identifier of the partial virtual figure, the partial virtual figure and the complete virtual figure corresponding to the partial virtual figure, and whether a virtual figure is a partial virtual figure or a complete virtual figure is no more required to be detected.

Since the virtual figures of both sides of the conversation are added to the conversation interface, to display the virtual figure of the object of the other side (that is, a friend, for example, the second object), an item for representing current figure information of the object, mainly a figure resource identifier (which may also be referred to as a figure resource ID, ID being short for identity document) of the virtual figure of the object, is required to be added to basic information on a data card of the object. The application client may request, according to the figure resource identifier and the service status of the object, for downloading the corresponding virtual figure. For part of content of the basic information on the data card, refer to Table 1.

TABLE 1

```
option optimize_for = LITE_RUNTIME;
package tc.im.oidb.friendCardInfo;
enum USER_STATUS
{
   USER_STATUS_ONLINE = 1; //online state
   USER_STATUS_ OFFLINE = 2; //offline state
   USER_STATUS_BUSY = 3; //busy state
   USER_STATUS_LEAVE = 4; //not available state
   . . .
};
message friendCardInfo
{
   . . .
   optional USER_STATUS status = 1; //service status of friend
   optional bytes 3d_emoji_res_id = 2; //figure resource identifier of friend
   . . .
}
```

It can be seen from Table 1 that different status values may be used to represent different service statuses. For example, a status value 1 represents an online state. A status value 2 represents an offline state. A status value 3 represents a busy state. A status value 4 represents a not available state. A specific state value corresponding to each service state is not limited in this embodiment of the disclosure.

Figure 11:
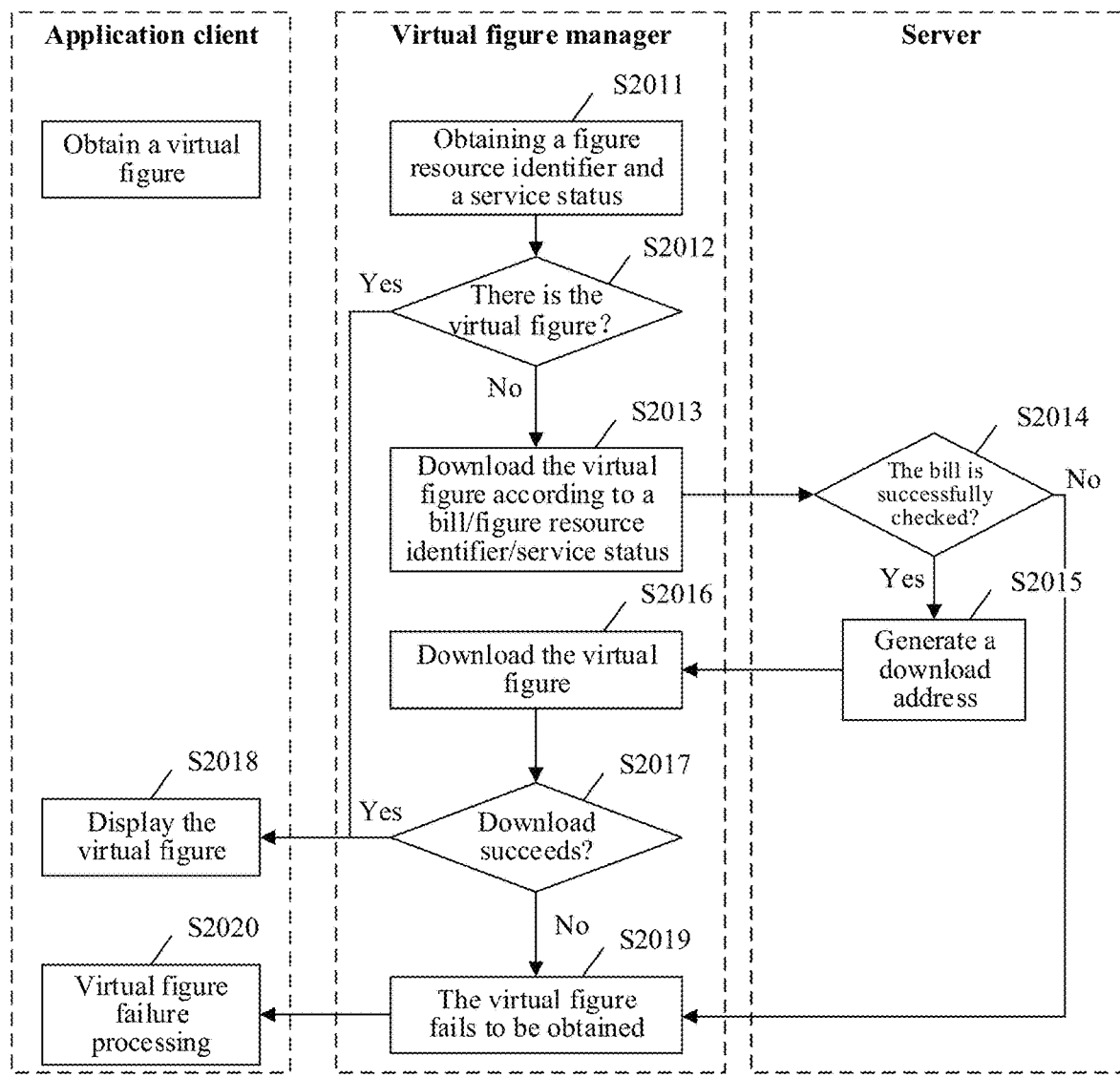
FIG. 11 is a schematic diagram of interaction for obtaining a virtual figure according to some embodiments of the disclosure.

Refer to FIG. 11 together. FIG. 11 is a schematic diagram of interaction for obtaining a virtual figure according to some embodiments of the disclosure. An example in which an application client on the first terminal interacts with the server is used for description. As shown in FIG. 11, the application client on the first terminal has a capability of obtaining a virtual figure. The application client includes a virtual figure manager (which may also be referred to as a virtual figure manager) dedicated to managing a virtual figure. A corresponding virtual figure may be returned according to an uploaded figure resource identifier and service status, and then is displayed. A specific interaction process may include the following operations:

Operation S2011: The virtual figure manager on the application client obtains a figure resource identifier (for example, the second figure resource identifier) and a service status (for example, the second service status) of an object (for example, the second object) in the conversation.

Operation S2012: The virtual figure manager searches in the virtual figure buffer whether there is a virtual figure matching the figure resource identifier and the service status. In case of a search success, the matched virtual figure is returned to the application client, and operation S2018 is performed. In case of a search failure, operation S2013 is performed.

Operation S2013: The virtual figure manager generates a corresponding figure resource obtaining request (which may also be referred to as a bill, for example, the second figure resource obtaining request) based on the figure resource identifier and the service status, and transmits the figure resource obtaining request to the server.

Operation S2014: After receiving the figure resource obtaining request transmitted by the virtual figure manager, the server performs request checking on the figure resource obtaining request, that is, verifies whether the figure resource obtaining request is a valid request. If the FIG. resource obtaining request is successfully checked, it indicates that the figure resource obtaining request is a valid request, and operation S2015 is performed. If the figure resource obtaining request fails to be checked, it indicates that the figure resource obtaining request is an invalid request, and operation S2019 is performed.

Operation S2015: The server generates a corresponding figure resource address (which may also be referred to as a download address, for example, the second figure resource address) based on the figure resource identifier and the service status that are carried in the figure resource obtaining request, and returns the figure resource address to the virtual figure manager.

Operation S2016: The virtual figure manager downloads the virtual figure of the object (for example, the second virtual figure) based on the received figure resource address.

Operation S2017: If the virtual figure manager succeeds in downloading, operation S2018 is performed. If the virtual figure manager fails in downloading, operation S2019 is performed.

Operation S2018: The application client displays the obtained virtual figure.

Operation S2019: The virtual figure manager receives a checking failure result returned by the server, generates request failure information based on the checking failure result, and reports the request failure information to the application client.

Operation S2020: The application client performs virtual figure failure processing based on the request failure information, for example, generates a figure obtaining failure notification based on the request failure information, and displays the figure obtaining failure notification on a corresponding interface.

It can be seen from the above that in some embodiments of the disclosure, the application client may obtain the virtual figure of the object based on the figure resource identifier of the object. In addition, different forms of the virtual figure may be displayed according to the service status of the object, so that diversity of the virtual figure may be improved. A current service status of the object may be directly and conveniently learned according to a form of the virtual figure.

Operation S202: Display, in a message display region of the conversation interface in response to a trigger operation on the conversation interface, a first conversation message transmitted by the first object to the second object.

In an implementation, voice information transmitted by the first object may be converted into a text in real time for transmission to the second object. For example, the voice information entered by the first object is translated into the text by using an existing voice recognition interface. Therefore, when a conversation message generated in this manner is transmitted to the second object, not only the voice information but also converted text information converted from the voice information are transmitted to the second object. In this manner, it is easy and convenient to generate a conversation message, use costs may be reduced, and conversation message generation efficiency may be improved. During entry of the voice information by the first object, if object image data of the first object (for example, the face of the first object) is captured, virtual-figure-based image data may be transmitted to the second object. For example, a facial bone of the first object may be recognized by using an existing face 3D deep reconstruction and application software development kit (SDK), and then is applied to the first virtual figure. Finally, a video may be recorded. The video is converted into image data of a GIF. A behavior of the virtual figure corresponding to the first object during entry of the voice information is displayed by using the GIF, thereby implementing communication between the objects more vividly.

Figure 12:
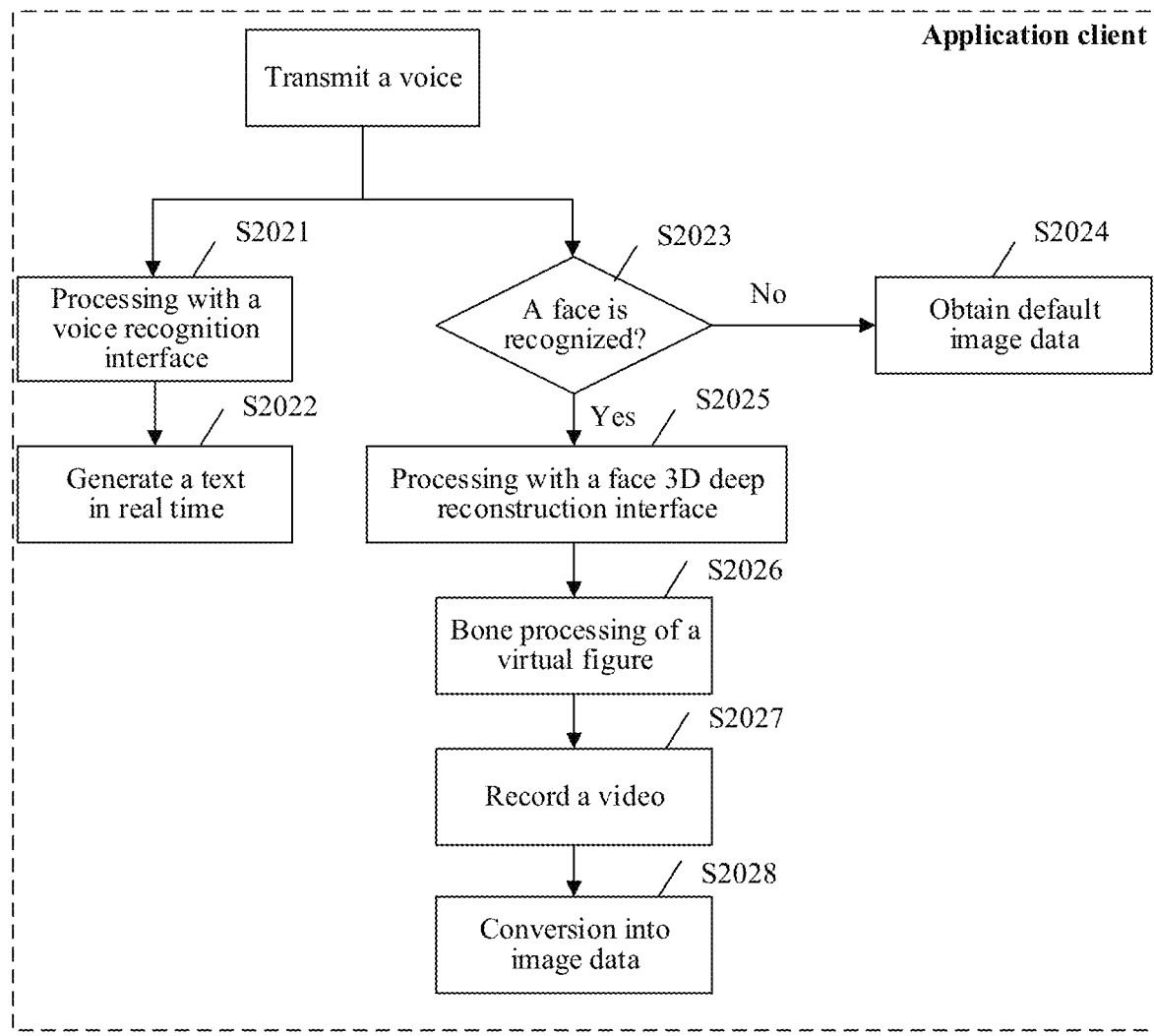
FIG. 12 is a schematic flowchart of entering voice information according to some embodiments of the disclosure.

Refer to FIG. 12 together. FIG. 12 is a schematic flowchart of entering the voice information according to some embodiments of the disclosure. As shown in FIG. 12, the process may be implemented on the application client of the first terminal. A specific process may be as follows.

Operation S2021: When a user enters the voice information, the application client of the first terminal invokes a voice recognition interface (that is, a voice recognition SDK) to process the voice information.

Operation S2022: The application client converts the voice information into the text (that is, the converted text information) in real time by using the voice recognition interface, so as to subsequently transmit the first conversation message carrying the converted text information when the first object ends voice entry.

Operation S2023: The application client detects, by using a camera, whether the face is recognized. If the face is recognized, operation S2025 is performed. If the face is not recognized, operation S2024 is performed.

Operation S2024: The application client obtains image data to be transmitted by default (that is, third-type image data).

Operation S2025: The application client recognizes a bone change by using a face 3D deep reconstruction interface (that is, the face 3D deep reconstruction and application SDK), for example, tracks a key point (for example, a facial or limb key point) on the first object, to obtain key point position data.

Operation S2026: The application client applies the bone change recognized by using the face 3D deep reconstruction interface to the first virtual figure, that is, updates the first virtual figure based on the obtained key point position data. For example, when the first object waves a hand, the first virtual figure waves a hand.

Operation S2027: The application client records a change of the first virtual figure to obtain the video.

Operation S2028: The application client converts the recorded video into the image data of the GIF (that is, second-type image data, for example, a dynamic image).

Finally, the application client may further integrate the obtained image data (the second-type image data or the third-type image data) and the voice information to obtain first object media data associated with the first object, and further generate, based on the first object media data, the first conversation message for transmission to the second object.

Figure 13:
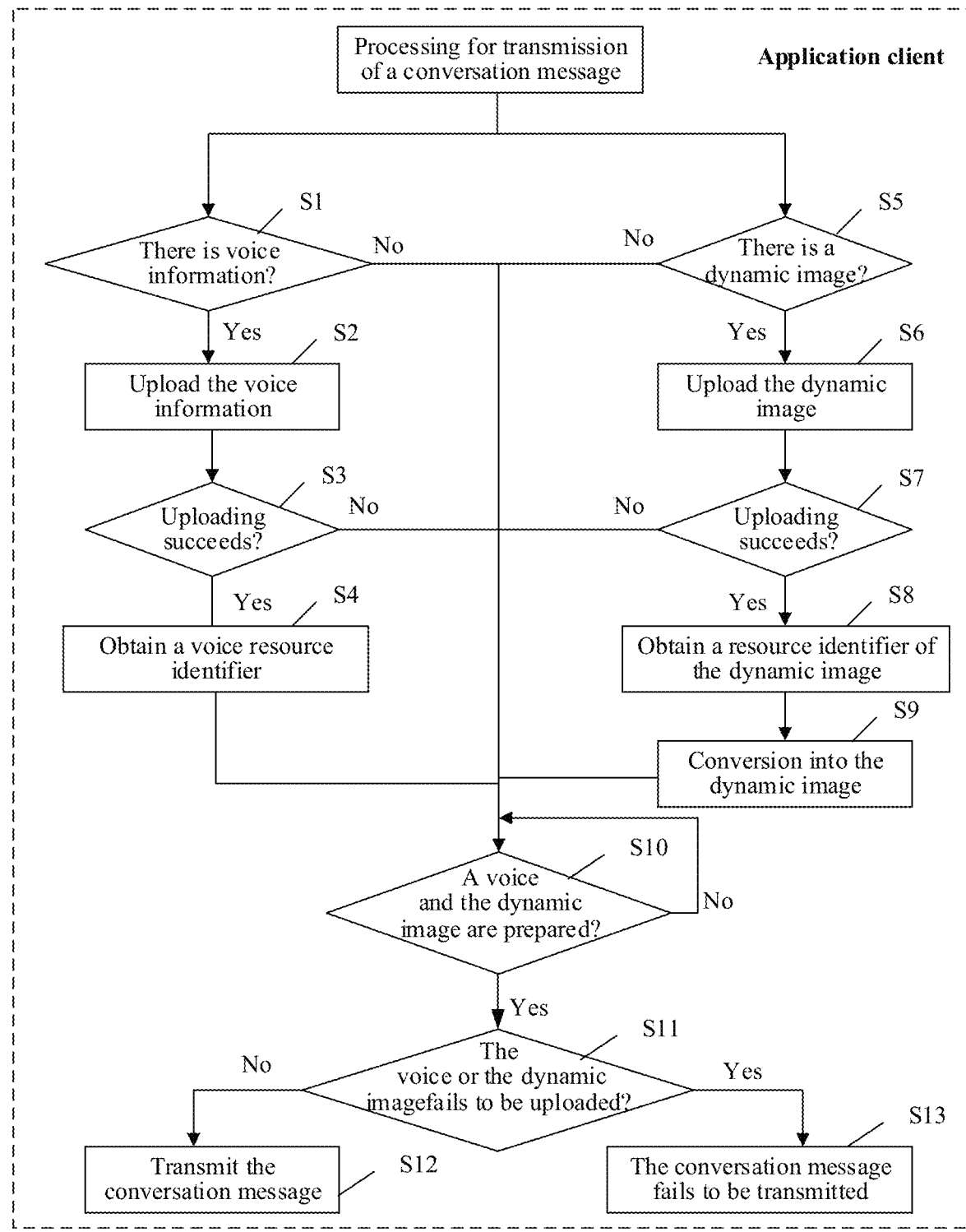
FIG. 13 is a schematic flowchart of transmitting a conversation message according to some embodiments of the disclosure.

When transmitting the voice information, the first object may upload the voice information and the corresponding image data to the server, such that the second object downloads a corresponding resource after receiving the conversation message. This reduces data transmission costs. Refer to FIG. 13 together. FIG. 13 is a schematic flowchart of transmitting the conversation message according to some embodiments of the disclosure. As shown in FIG. 13, when the first conversation message is transmitted, the application client may trigger transmission of the first conversation message only when the voice information and the corresponding image data are successfully uploaded to the server. In some embodiments of the disclosure, an example in which the second-type image data is a dynamic image of the GIF is used for description. A specific process may be as follows.

Operation S1: The application client detects whether there is currently the voice information. If there is currently the voice information, operation S2 is performed. If there is currently no voice information, operation S10 is performed.

Operation S2: The application client uploads the voice information to the server.

Operation S3: The application client obtains a voice uploading result returned by the server. If the voice uploading result indicates that the voice information is successfully uploaded, operation S4 is performed. If the voice uploading result indicates that the voice information fails to be uploaded, operation S10 is performed. In some embodiments, when the voice information fails to be uploaded, the application client may re-upload the voice information to obtain a new voice uploading result.

Operation S4: The application client obtains a voice resource identifier corresponding to the voice information. The voice resource identifier is generated by the application client.

Operation S5: The application client detects whether there is currently a dynamic image (that is, detects whether the object image data of the first object is captured). If there is currently the dynamic image, operation S6 is performed. If there is currently no dynamic image, operation S10 is performed.

Operation S6: The application client uploads the dynamic image to the server.

Operation S7: The application client obtains an image uploading result returned by the server. If the image uploading result indicates that the dynamic image is successfully uploaded, operation S8 is performed. If the image uploading result indicates that the dynamic image fails to be uploaded, operation S10 is performed. In some embodiments, when the dynamic image fails to be uploaded, the application client may re-upload the dynamic image to obtain a new image uploading result.

Operation S8: The application client obtains an image resource identifier corresponding to the dynamic image. The image resource identifier is generated by the application client.

Operation S9: The application client converts the video obtained by recording the first virtual figure into the dynamic image of the GIF, and determines the dynamic image as the second-type image data. This may reduce transmission costs brought by video transmission, thereby improving conversation message transmission efficiency.

Operation S10: The application client inquires whether the voice information and the dynamic image are prepared. If both the voice information and the dynamic image are prepared, operation S11 is performed. Since the voice information and the dynamic image are transmitted separately, there may be such a case that one of the voice information and the dynamic image is prepared, but the other is not yet. Therefore, the application client may keep waiting.

Operation S11: If the voice information fails to be uploaded or the dynamic image fails to be uploaded, operation S13 is performed. If both the voice information and the dynamic image are successfully uploaded, operation S12 is performed.

Operation S12: The application client transmits the first conversation message generated based on the voice information and the dynamic image.

Operation S13: The application client fails to transmit the conversation message, and feeds back transmission failure information to the first object.

In some embodiments, after the first conversation message is successfully uploaded, a second terminal may subsequently obtain, based on the image resource identifier and the voice resource identifier, the corresponding voice information and image data from a message resource library storing conversation messages, thereby improving resource transmission efficiency.

For a specific implementation of operation 202, refer to operation S102 in the embodiment corresponding to FIG. 3. The same content will not be elaborated herein.

Operation S203: Update the first virtual figure to a first virtual update figure in the virtual figure display region including the second virtual figure.

In an implementation, to enrich methods for interaction between the objects, sticker-based interaction between the objects may be reflected in the virtual figures in the conversation (that is, a scene in which the first object media data includes the first-type image data in the embodiment corresponding to FIG. 3). It is to be understood that displaying of sticker-based interaction is limited to only all in one (AIO) (a common chat window component capable of providing unified interaction experience for the object) of the current conversation, is not roamed and synchronized, is valid in only the current AIO, and is only required to be processed by the application client. In conversation message transmission and reception management (that is, a message manager), if a conversation message carrying a sticker (that is, first-type image data) is detected, an external component is notified for processing. In addition, emoji information (which may also be referred to as sticker information) is transmitted to a service processing. After receiving a notification, the server may perform corresponding processing.

Figure 14:
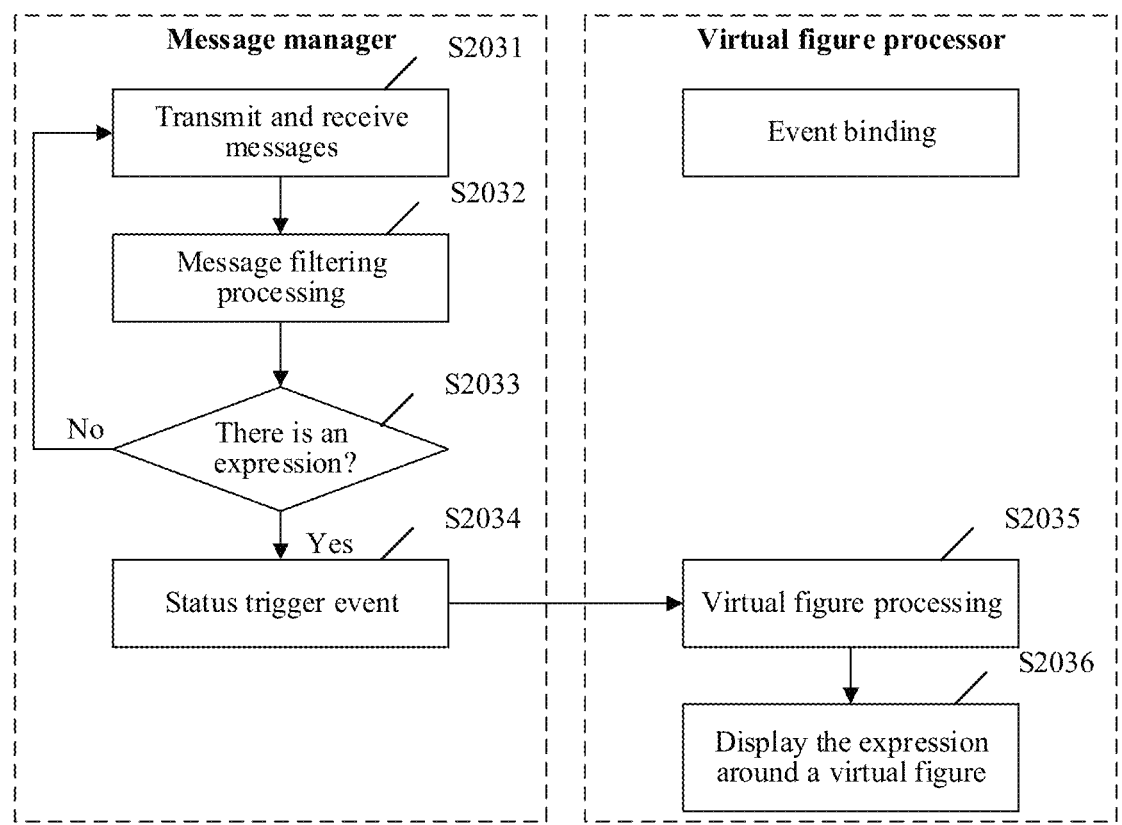
FIG. 14 is a schematic flowchart of updating a virtual figure according to some embodiments of the disclosure.

Refer to FIG. 14 together. FIG. 14 is a schematic flowchart of updating a virtual figure according to some embodiments of the disclosure. The application client is integrated with the message manager (which may also be referred to as a message manager) and a virtual figure processor (which may also be referred to as an AIO virtual figure). The message manager may be configured to transmit and receive a conversation message. The virtual figure processor is configured for displaying, updating, or the like of a virtual figure. As shown in FIG. 14, the process may specifically include the following operations:

Operation S2031: The message manager continuously transmits and receives conversation messages.

Operation S2032: The message manager performs message filtering processing on all the conversation messages (including conversation messages transmitted and received by the first terminal) obtained by the first terminal, that is, performs media data detection on all the conversation messages, and screen out a conversation message including the first-type image data (for example, a sticker) based on a detection result.

Operation S2033: The message manager determines, based on the detection result, whether the conversation message includes the first-type image data. If a conversation message (for example, a conversation message 1) is detected not to include the first-type image data, the conversation message is discarded, and operation S2031 is performed. If a conversation message (for example, a conversation message 2) is detected to include the first-type image data, operation S2034 is performed.

Operation S2034: The message manager generates a status trigger event (that is, a fire emoji event), and transmits the status trigger event to the virtual figure processor. The status trigger event includes an object identifier (that is, a user identification number UIN) of a message transmitter (for example, the first object) and an image data list (emoji_list, which may also be referred to as an emoji list).

Operation S2035: The virtual figure processor monitors, by using an event binding mechanism, a status trigger event transmitted from another place. Therefore, when receiving the status trigger event transmitted by the message manager, the virtual figure processor may update, based on the first-type image data in the image data list, a virtual figure (for example, the first virtual figure) of the object indicated by the object identifier in the status trigger event.

Operation S2036: The virtual figure processor displays the first-type image data in a region adjacent to an updated virtual figure (for example, the first virtual update figure).

In some embodiments, for the first virtual figure, the virtual figure processor may search in the figure resource library or a virtual figure buffer for a virtual figure matching the first-type image data in the image data list as the first virtual update figure.

In some embodiments, when a conversation message includes a plurality of pieces of first-type image data, the virtual figure processor may select any one of the plurality of pieces of first-type image data as first-type target image data, and update a corresponding virtual figure based on the first-type target image data. For example, first first-type image data in the conversation message may be selected as the first-type target image data. In some embodiments, first-type image data in a largest amount in the conversation message may be selected as the first-type target image data. In some embodiments, the corresponding virtual figure is updated sequentially according to an order of the first-type image data in the conversation message.

For a specific implementation of this operation, refer to operation S103 in the embodiment corresponding to FIG. 3. The same content will not be elaborated herein.

Operation S204: Update, in response to detecting that the first conversation message carries a background mapping text, an original virtual background to a virtual update background based on the background mapping text, and generate, based on the first virtual update figure, the second virtual figure, and the virtual update background, a background-fused virtual figure for displaying in the virtual figure display region.

Specifically, a virtual background associated with the first virtual figure and the second virtual figure may be determined as the original virtual figure in the virtual figure display region. The first terminal may perform text detection on the first conversation message, update, in response to detecting that the first conversation message carries the background mapping text, the original virtual background to the virtual update background based on the background mapping text, and further perform data fusion on the first virtual update figure, the second virtual figure, and the virtual update background to obtain the background-fused virtual figure for displaying in the virtual figure display region. This may improve a fusion degree between the virtual background and the virtual figure to enhance presence in the conversation.

In some embodiments, a corresponding background display threshold may be set for the virtual update background. For example, when display duration of the virtual update background is equal to the background display threshold, the virtual update background may be recovered to the original virtual background, and correspondingly, the background-fused virtual figure is recovered to the first virtual update figure.

In some embodiments, after the original virtual background is updated to the virtual update background, the virtual update background may be maintained for a long time until the virtual update background is updated next time.

In some embodiments, when a specific conversation message carries no first object media data but the background mapping text, the virtual background may still be updated based on the background mapping text, and data fusion may be performed on an updated virtual background, the first virtual figure, and the second virtual figure.

Figure 15:
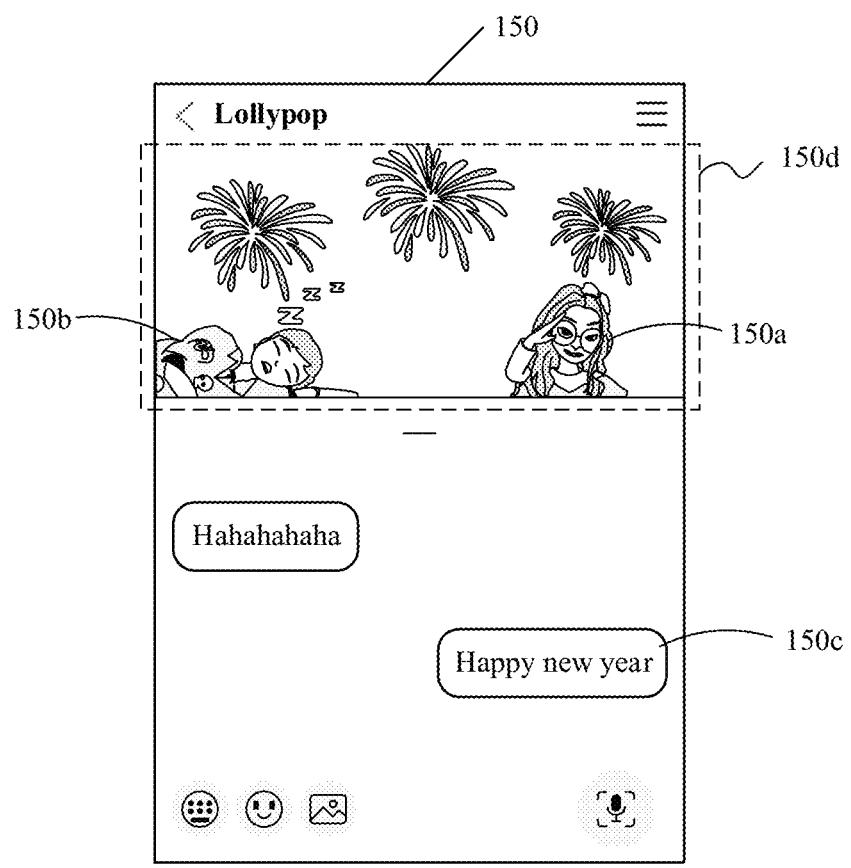
FIG. 15 is a schematic diagram of a scene in which a virtual background is updated according to some embodiments of the disclosure.

Refer to FIG. 15 together. FIG. 15 is a schematic diagram of a scene in which the virtual background is updated according to some embodiments of the disclosure. As shown in FIG. 15, the object A and the object B conduct a conversation by using a conversation interface 150. If a conversation message 150c transmitted by the object A carries a background mapping text, for example, "Happy new year", an original virtual background associated with a virtual FIG. 150a and a virtual FIG. 150b in a virtual figure display region 150d may be updated to a virtual update background mapped by the background mapping text carried in the conversation message 150c, for example, may be updated to a virtual firework background mapped by the background mapping text "Happy new year". In addition, data fusion may be performed on the virtual firework background, the virtual FIG. 150a, and the virtual FIG. 150b. After successful fusion, a virtual figure (that is, a background-fused virtual figure) finally displayed in the virtual figure display region 150d is highly fused with the virtual firework background. That is, the virtual update background may affect the virtual figure in the virtual update background. For example, when virtual fireworks are red, light projected to the background-fused virtual figure is red.

In some implementations, when it is detected that the first conversation message carries a wear mapping keyword, for example, text information in the first conversation message carries the wear mapping keyword, or the voice information in the first conversation message carries a wear mapping keyword, the first virtual figure may be updated based on the detected wear mapping keyword. For example, a virtual wear (for example, clothes, a head-wear, a hat, eyeglasses, a knapsack, a weapon, or a toy) matching the wear mapping keyword is added to the first virtual figure. For example, when a conversation message X carries a wear mapping keyword "hat", any hat may be selected from the figure resource library and added to a corresponding virtual figure, thereby obtaining a virtual figure in the hat.

Operation S205: Recover the first virtual update figure to the first virtual figure based on display duration of the first virtual update figure is equal to a display duration threshold.

Specifically, in some embodiments of the disclosure, the display duration threshold may be set for the first virtual update figure. The first virtual update figure may be recovered to the first virtual figure in the case that the display duration of the first virtual update figure is equal to the display duration threshold. A specific value of the display duration threshold is not limited in this embodiment of the disclosure.

Operation S206: Display, based on a third conversation message transmitted by the second object is received, the third conversation message in the message display region of the conversation interface, and update the second virtual figure based on second object media data that is carried in the third conversation message and that is associated with the second object.

Specifically, when receiving the third conversation message transmitted by the second object, the first terminal may display the third conversation message in the message display region of the conversation interface. The third conversation message carries the second object media data associated with the second object. Further, the second virtual figure may be updated to a third virtual update figure in the virtual figure display region including the second virtual figure. The third virtual update figure is obtained by updating the second virtual figure based on the second object media data. A specific process of this operation is similar to the process of updating the first virtual figure to the first virtual update figure based on the first object media data in the embodiment corresponding to FIG. 3, and will not be elaborated herein.

Operation S207: Update a service status of the first object to a service update status in response to a switching operation on the service status of the first object, and update, in the virtual figure display region including the second virtual figure, the first virtual figure to a second virtual update figure matching the service update status.

Specifically, the first terminal updates the service status of the first object to the service update status in response to the switching operation on the service status of the first object, and may further update, in the virtual figure display region including the second virtual figure, the first virtual figure to the second virtual update figure matching the service update status. For example, when the object A changes a service status of the object A from the resting state to the online state, a virtual figure of the object A is updated from a virtual figure (for example, in a sleeping form) matching the resting state to a virtual figure (for example, in a standing form) matching the online state.

Figure 16:
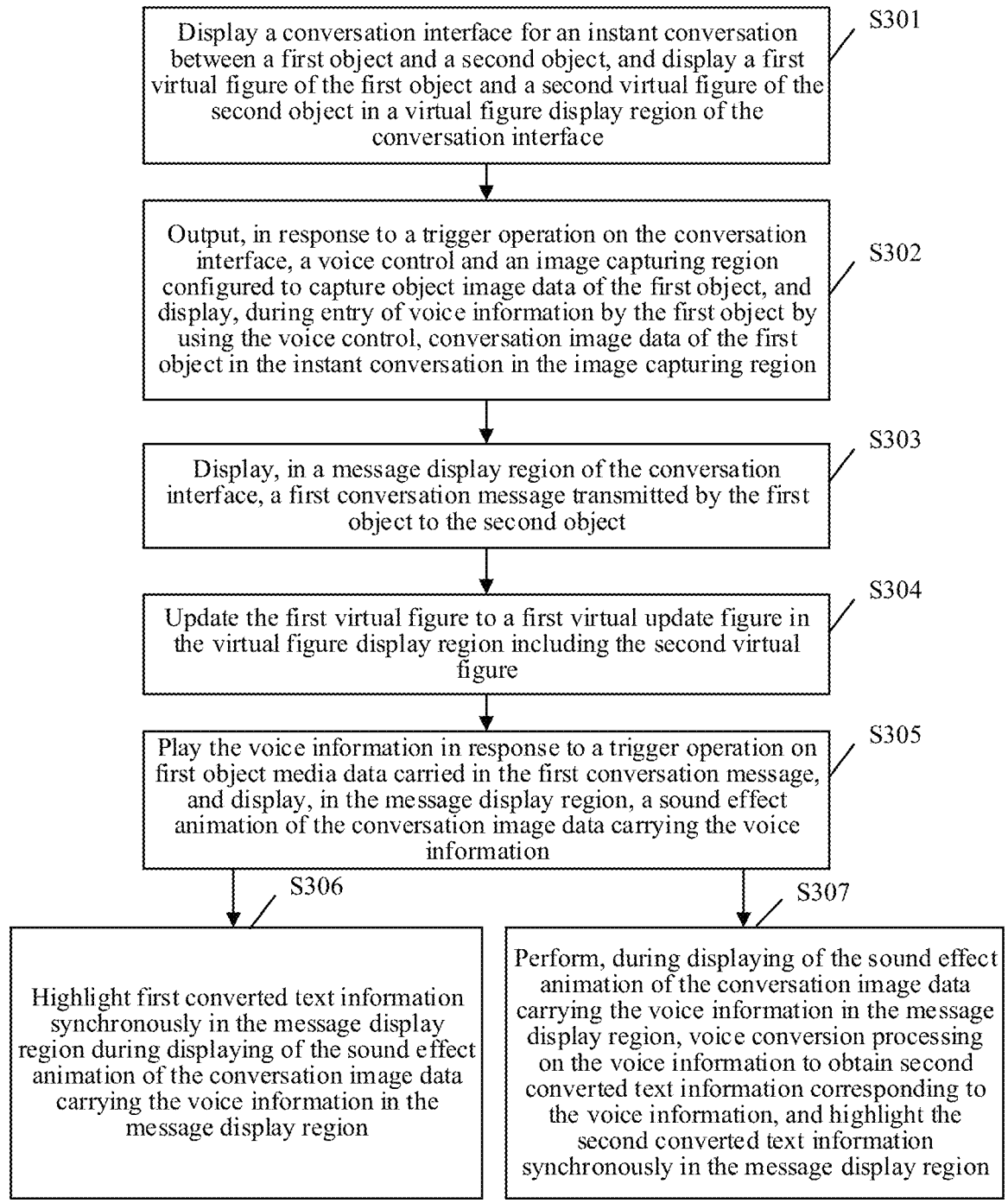
FIG. 16 is a schematic flowchart of a virtual-figure-based data processing method according to some embodiments of the disclosure.

Refer to FIG. 16. FIG. 16 is a schematic flowchart of a virtual-figure-based data processing method according to some embodiments of the disclosure. The data processing method may be performed by a computer device. The computer device may include the user terminal or server shown in FIG. 1. For ease of understanding, an example in which the method is performed by a first terminal (for example, the user terminal 200*a*) is used for description in some embodiments. Some embodiments of the disclosure may be used as a specific implementation of the embodiment corresponding to FIG. 3. The data processing method may include at least the following operations:

Operation S301: Display a conversation interface for a conversation between a first object and a second object, and display a first virtual figure of the first object and a second virtual figure of the second object in a virtual figure display region of the conversation interface.

For a specific implementation of this operation, refer to operation S101 in the embodiment corresponding to FIG. 3. The same content will not be elaborated herein.

Operation S302: Output, in response to a trigger operation on the conversation interface, a voice control and an image capturing region configured to capture object image data of the first object, and display, during entry of voice information by the first object by using the voice control, conversation image data of the first object in the conversation in the image capturing region.

Specifically, the first terminal may output, in response to the trigger operation on the conversation interface, the voice control (for example, the voice control 901*a* shown in FIG. 9) and the image capturing region (for example, the image capturing region 901*b* shown in FIG. 9) configured to capture the object image data of the first object, and invoke, during entry of the voice information by the first object by using the voice control, a camera to capture the object image data of the first object. The voice control may be a control independent of the image capturing region. In some embodiments, the voice control may be a control in the image capturing region.

Further, when the object image data is captured, the conversation image data of the first object in the conversation may be determined based on the object image data, and the conversation image data may be displayed in the image capturing region. The conversation image data may be used for representing an object status of the first object in the conversation.

In some embodiments, the conversation image data is generated based on the captured object image data of the first object. That is, a reconstructed virtual figure fitting the first object may be reconstructed based on the object image data, and the conversation image data of the first object in the conversation may be generated based on the reconstructed virtual figure. For example, a rendering engine on an application client may perform image rendering according to real object data of the first object (for example, data about a hairstyle, clothes, or a position of the first object), to obtain the reconstructed virtual figure of the first object. It may be understood that the reconstructed virtual figure may change with the first object.

In some embodiments, the conversation image data is obtained by adjusting a figure status of the first virtual figure based on the captured object image data of the first object. That is, the figure status of the first virtual figure is adjusted based on the object image data, and the conversation image data of the first object in the conversation, that is, second-type image data, for example, the second-type image data 901*c* in the embodiment corresponding to FIG. 9, is generated based on a first virtual figure in an adjusted figure status. For a specific process, refer to the related descriptions about generation of the second-type image data in operation S102 in the embodiment corresponding to FIG. 3.

Operation S303: Display, in a message display region of the conversation interface, a first conversation message transmitted by the first object to the second object.

Specifically, the first terminal may determine, based on the conversation image data and the voice information, first object media data associated with the first object. A specific process may be as follows: the first terminal integrates the conversation image data and the voice information to obtain integrated conversation image data carrying the voice information, and determine the conversation image data carrying the voice information as the first object media data associated with the first object. For a specific process, refer to the related descriptions about generation of the first object media data in operation S102 in the embodiment corresponding to FIG. 3.

Further, the first conversation message transmitted by the first object to the second object may be generated based on the first object media data. In some embodiments, the first terminal may determine the first object media data (for example, the first object media data 902b shown in FIG. 9) as the first conversation message for transmission to the second object. That is, in this case, the first conversation message may include a conversation sub-message.

In some embodiments, the first terminal may integrate converted text information obtained by performing voice conversion processing on the voice information and the first object media data to obtain the first conversation message for transmission to the second object. That is, in this case, the first conversation message may include two conversation sub-messages, for example, the first object media data 902b and the converted text information 902c shown in FIG. 9. In some embodiments, the converted text information may be converted text information (that is, first converted text information) that is obtained by performing, during entry of the voice information by the first object by using the voice control in the image capturing region, voice conversion processing on the entered voice information and that corresponds to the voice information. The converted text information may be displayed in the image capturing region. The converted text information and the conversation image data of the first object in the conversation may be displayed at different positions in the image capturing region. For example, refer to the image capturing region 901b shown in FIG. 9.

Finally, after the first conversation message is transmitted, the first conversation message may be displayed in the message display region of the conversation interface.

Operation S304: Update the first virtual figure to a first virtual update figure in the virtual figure display region including the second virtual figure.

For a specific implementation of this operation, refer to operation S103 in the embodiment corresponding to FIG. 3. The same content will not be elaborated herein.

Operation S305: Play the voice information in response to a trigger operation on the first object media data carried in the first conversation message, and display, in the message display region, a sound effect animation of the conversation image data carrying the voice information.

Specifically, the first object media data carried in the first conversation message may include the conversation image data carrying the voice information. The conversation image data may be obtained by adjusting the figure status of the first virtual figure based on the captured object image data of the first object, or may be generated based on the captured object image data of the first object. A generation manner for the conversation image data is not limited in this embodiment of the disclosure. The first terminal may play the voice information in response to the trigger operation (for example, a tap operation) on the first object media data, and display, in the message display region, the sound effect animation of the conversation image data carrying the voice information, like playing a video integrating the voice information and the conversation image data. The sound effect animation may include an image animation corresponding to the conversation image data, and in addition, in some embodiments, may further include a pulse animation associated with the voice information, for example, a pulse animation that changes randomly or a pulse animation that changes with a volume corresponding to the voice information. For an example scene, refer to the embodiment corresponding to FIG. 9.

Operation S306: Highlight the first converted text information synchronously in the message display region during displaying of the sound effect animation of the conversation image data carrying the voice information in the message display region.

Specifically, when the first conversation message further includes the first converted text information (for example, the converted text information 902c shown in FIG. 9) obtained by performing voice conversion processing on the voice information in the image capturing region, the first terminal may highlight the first converted text information synchronously in the message display region during displaying of the sound effect animation of the conversation image data carrying the voice information in the message display region.

Operation S307: Perform, during displaying of the sound effect animation of the conversation image data carrying the voice information in the message display region, voice conversion processing on the voice information to obtain second converted text information corresponding to the voice information, and highlight the second converted text information synchronously in the message display region.

Specifically, if the first conversation message includes only one conversation sub-message, that is, the first object media data, the first terminal may further perform, during displaying of the sound effect animation of the conversation image data carrying the voice information in the message display region, voice conversion processing in real time on the voice information to obtain the second converted text information corresponding to the voice information, and highlight the second converted text information synchronously in the message display region.

In some embodiments of the disclosure, a novel manner for conducting a conversation in a virtual social scene is provided by full use of a virtual figure of an object. First, in terms of an interface structure of a conversation interface, a virtual figure display region of the conversation interface is configured to display virtual figures of both sides of the conversation. The virtual figure may display service status of a corresponding object. In addition, the virtual figure may change with object media data (for example, a sticker) carried in a conversation message transmitted by the corresponding object. The virtual figure may more vividly express an affection (that is, an object status) of the object when transmitting the conversation message. A message display region of the conversation interface is configured to display a historical conversation message, to help the object trace the historical conversation message. Second, when a specific object enters voice information, once a camera captures object image data of the object (for example, the face of the object), an action and an expression of the object when speaking start to be recorded in a manner of a virtual figure to generate second-type image data (for example, a dynamic image of the virtual figure), and in addition, the voice information may be converted into a text in real time. In addition, a conversation message transmitted by the object also carries the second-type image data, and the expression of the object when speaking may be displayed by using the second-type image data. Moreover, the conversation message carrying the second-type image data may be triggered to listen to a voice of a transmitter. In this manner, text input costs are reduced, and recording the expression of the speaker may deliver an affection of the object better.

Figure 17:
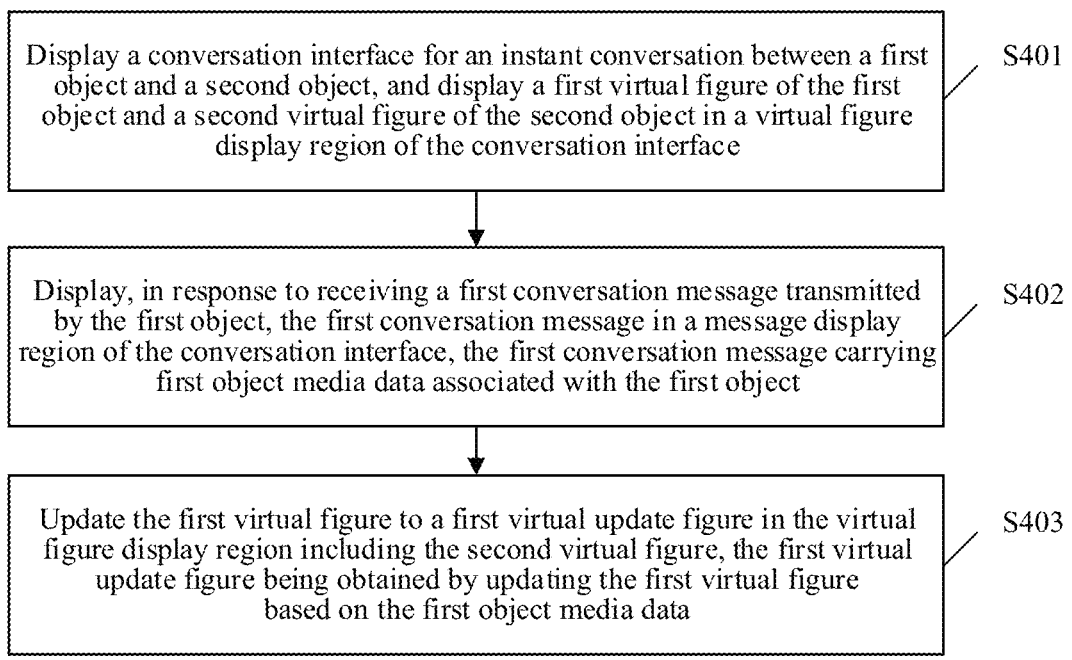
FIG. 17 is a schematic flowchart of a virtual-figure-based data processing method according to some embodiments of the disclosure.

Refer to FIG. 17. FIG. 17 is a schematic flowchart of a virtual-figure-based data processing method according to some embodiments of the disclosure. The data processing method may be performed by a computer device. The computer device may include the user terminal or server shown in FIG. 1. For ease of understanding, an example in which the method is performed by a second terminal (for example, the user terminal 200b) is used for description in this embodiment. The data processing method may include at least the following operations:

Operation S401: Display a conversation interface for a conversation between a first object and a second object, and display a first virtual figure of the first object and a second virtual figure of the second object in a virtual figure display region of the conversation interface.

In some embodiments of the disclosure, an interface structure of the conversation interface on the second terminal is the same as that of a conversation interface on a first terminal. Therefore, to distinguish the conversation interfaces on both sides, the conversation interface on the first terminal is referred to as a first conversation interface, and the conversation interface on the second terminal is referred to as a second conversation interface. The second terminal may display the second conversation interface for the conversation between the first object and the second object, determine a partial virtual figure for representing the first object as the first virtual figure of the first object, and determine a partial virtual figure for representing the second object as the second virtual figure of the second object. Further, the first virtual figure and the second virtual figure are displayed in the virtual figure display region of the second conversation interface.

For a specific implementation of this operation, refer to operation S101 in the embodiment corresponding to FIG. 3. Elaborations are omitted herein.

Operation S402: Display, in response to receiving a first conversation message transmitted by the first object, the first conversation message in a message display region of the conversation interface, the first conversation message carrying first object media data associated with the first object.

Specifically, after successfully receiving the first conversation message transmitted by the first object, the second terminal may display the first conversation message in the message display region of the second conversation interface.

Operation S403: Update the first virtual figure to a first virtual update figure in the virtual figure display region including the second virtual figure, the first virtual update figure being obtained by updating the first virtual figure based on the first object media data.

For a specific implementation of this operation, refer to operation S103 in the embodiment corresponding to FIG. 3. Elaborations are omitted herein.

Figure 18:
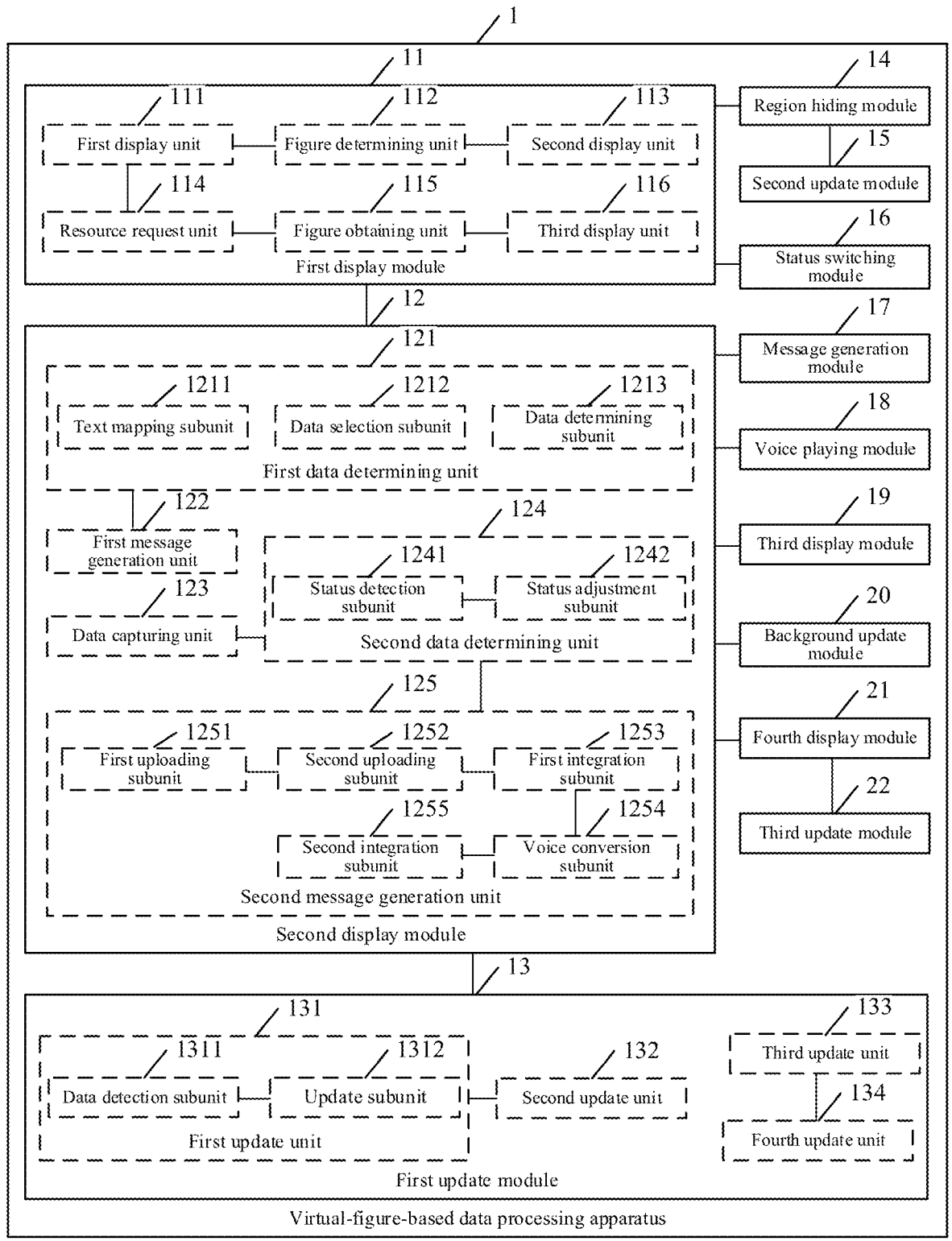
FIG. 18 is a schematic diagram of a structure of a virtual-figure-based data processing apparatus according to some embodiments of the disclosure.

Refer to FIG. 18. FIG. 18 is a schematic diagram of a structure of a virtual-figure-based data processing apparatus according to some embodiments of the disclosure. The virtual-figure-based data processing apparatus may be a computer program (including program code) run in a computer device. For example, the virtual-figure-based data processing apparatus is application software. The apparatus may be configured to perform corresponding operations in the virtual-figure-based data processing method provided in the embodiments of the disclosure. As shown in FIG. 18, the virtual-figure-based data processing apparatus 1 may include a first display module 11, a second display module 12, a first update module 13, a region hiding module 14, a second update module 15, a status switching module 16, a message generation module 17, a voice playing module 18, a third display module 19, a background update module 20, a fourth display module 21, and a third update module 22.

The first display module 11 is configured to display a conversation interface for a conversation between a first object and a second object, and display a first virtual figure of the first object and a second virtual figure of the second object in a virtual figure display region of the conversation interface.

The first display module 11 may include a first display unit 111, a figure determining unit 112, a second display unit 113, a resource request unit 114, a figure obtaining unit 115, and a third display unit 116.

The first display unit 111 is configured to display the conversation interface for the conversation between the first object and the second object.

The figure determining unit 112 is configured to determine a partial virtual figure for representing the first object as the first virtual figure of the first object, and determine a partial virtual figure for representing the second object as the second virtual figure of the second object.

The second display unit 113 is configured to display the first virtual figure and the second virtual figure in the virtual figure display region of the conversation interface.

The resource request unit 114 is configured to obtain a first figure resource identifier and a first service status that correspond to the first object, obtain a second figure resource identifier and a second service status that correspond to the second object, generate a figure resource obtaining request based on the first figure resource identifier, the first service status, the second figure resource identifier, and the second service status, and transmit the figure resource obtaining request to a server. The server is configured to generate, based on the first figure resource identifier and the first service status in response to receiving the figure resource obtaining request, a first figure resource address corresponding to the first virtual figure, generate, based on the second figure resource identifier and the second service status, a second figure resource address corresponding to the second virtual figure, and return a first figure resource address and a second figure resource address.

The figure obtaining unit 115 is configured to receive the first figure resource address and the second figure resource address that are returned by the server, obtain, based on the first figure resource address, the first virtual figure associated with the first object, and obtain, based on the second figure resource address, the second virtual figure associated with the second object.

The third display unit 116 is configured to display the first virtual figure and the second virtual figure in the virtual figure display region of the conversation interface.

For specific implementations of the first display unit 111, the figure determining unit 112, the second display unit 113, the resource request unit 114, the figure obtaining unit 115, and the third display unit 116, refer to the descriptions about operation S101 in the embodiment corresponding to FIG. 3, or refer to the descriptions about operation S201 in the embodiment corresponding to FIG. 10. Elaborations are omitted herein.

The second display module 12 is configured to display, in a message display region of the conversation interface in response to a trigger operation on the conversation interface, a first conversation message transmitted by the first object to the second object. The first conversation message carries first object media data associated with the first object.

The second display module 12 may include a first data determining unit 121, a first message generation unit 122, a data capturing unit 123, a second data determining unit 124, and a second message generation unit 125.

The first data determining unit 121 is configured to determine, in response to the trigger operation on the conversation interface, first-type image data for representing an object status of the first object in the conversation.

The first data determining unit 121 may include a text mapping subunit 1211, a data selection subunit 1212, and a data determining subunit 1213.

The text mapping subunit 1211 is configured to display, in response to a trigger operation on a text entry control on the conversation interface, text information entered by using the text entry control, and display, in response to detecting that the text information carries a status mapping text, the first-type image data that is mapped by the status mapping text and that is used for representing the object status of the first object in the conversation.

The data selection subunit 1212 is configured to output, in response to a trigger operation on a status display control on the conversation interface, an image selection panel associated with the status display control, and determine, in response to a selection operation on the image selection panel, image data corresponding to the selection operation as the first-type image data for representing the object status of the first object in the conversation.

The data determining subunit 1213 is configured to determine, in response to a determining operation on target image data on the conversation interface, the target image data as the first-type image data for representing the object status of the first object in the conversation.

For specific implementations of the text mapping subunit 1211, the data selection subunit 1212, and the data determining subunit 1213, refer to the descriptions about operation S102 in the embodiment corresponding to FIG. 3. Elaborations are omitted herein.

The first message generation unit 122 is configured to determine the first-type image data as the first object media data associated with the first object, generate, based on the first object media data, the first conversation message for transmission to the second object, and display the first conversation message in the message display region of the conversation interface.

The data capturing unit 123 is configured to invoke, in response to the trigger operation on the conversation interface during entry of voice information by the first object by using a voice control, a camera to capture object image data of the first object.

The second data determining unit 124 is configured to adjust, based on the object image data is captured, a figure status of the first virtual figure based on the object image data, and generate, based on a first virtual figure in an adjusted figure status, second-type image data for representing an object status of the first object in the conversation.

The second data determining unit 124 may include a status detection subunit 1241 and a status adjustment subunit 1242.

The status detection subunit 1241 is configured to perform, in the case that the object image data is captured, status detection on the object image data, and determine a detected status as the object status of the first object in the conversation.

The status adjustment subunit 1242 is configured to obtain the first virtual figure, adjust the figure status of the first virtual figure based on the object status, and generate, based on the first virtual figure in the adjusted figure status, the second-type image data for representing the object status.

For specific implementations of the status detection subunit 1241 and the status adjustment subunit 1242, refer to the descriptions about operation S102 in the embodiment corresponding to FIG. 3. Elaborations are omitted herein.

The second message generation unit 125 is configured to integrate the second-type image data and the voice information to obtain the first object media data associated with the first object, generate, based on the first object media data, the first conversation message for transmission to the second object, and display the first conversation message in the message display region of the conversation interface.

The second message generation unit 125 may include a first uploading subunit 1251, a second uploading subunit 1252, a first integration subunit 1253, a voice conversion subunit 1254, and a second integration subunit 1255.

The first uploading subunit 1251 is configured to upload the second-type image data to a server, and obtain, based on the second-type image data is successfully uploaded, an image resource identifier corresponding to the second-type image data.

The second uploading subunit 1252 is configured to upload the voice information to the server, and obtain, based on the voice information is successfully uploaded, a voice resource identifier corresponding to the voice information.

The first integration subunit 1253 is configured to integrate the second-type image data carrying the image resource identifier and the voice information carrying the voice resource identifier to obtain the first object media data associated with the first object.

The voice conversion subunit 1254 is configured to perform voice conversation processing on the voice information to obtain converted text information corresponding to the voice information, and display the converted text information in an image capturing region configured to capture the object image data.

The second integration subunit 1255 is configured to integrate the converted text information and the first object media data to obtain the first conversation message for transmission to the second object.

For specific implementations of the first uploading subunit 1251, the second uploading subunit 1252, the first integration subunit 1253, the voice conversion subunit 1254, and the second integration subunit 1255, refer to the descriptions about operation S102 in the embodiment corresponding to FIG. 3. Elaborations are omitted herein.

For specific implementations of the first data determining unit 121, the first message generation unit 122, the data capturing unit 123, the second data determining unit 124, and the second message generation unit 125, refer to the descriptions about operation S102 in the embodiment corresponding to FIG. 3. Elaborations are omitted herein.

The first update module 13 is configured to update the first virtual figure to a first virtual update figure in the virtual figure display region including the second virtual figure. The first virtual update figure is obtained by updating the first virtual figure based on the first object media data.

The first update module 13 is specifically configured to update the first virtual figure based on the first object media data to obtain the first virtual update figure matching the first object media data, and update the first virtual figure to the first virtual update figure in the virtual figure display region including the second virtual figure.

The first update module 13 may include a first update unit 131, a second update unit 132, a third update unit 133, and a fourth update unit 134.

The first update unit 131 is configured to update, based on the first object media data includes first-type image data, the first virtual figure based on the first-type image data to obtain the first virtual update figure matching the first-type image data.

The first update unit 131 may include a data detection subunit 1311 and an update subunit 1312.

The data detection subunit 1311 is configured to perform media data detection on the first conversation message by using a message manager, generate a status trigger event in response to detecting that the first object media data carried in the first conversation message includes the first-type image data, and transmit the status trigger event to a virtual figure processor. The status trigger event includes an object identifier of the first object and an image data list. The image data list is used for recording the first-type image data in the first object media data.

The update subunit 1312 is configured to update, based on the first-type image data in the image data list based on the virtual figure processor receives the status trigger event, the first virtual figure associated with the object identifier to obtain the first virtual update figure matching the first-type image data.

For specific implementations of the data detection subunit 1311 and the update subunit 1312, refer to the descriptions about operation S103 in the embodiment corresponding to FIG. 3. Elaborations are omitted herein.

The second update unit 132 is configured to update the first virtual figure to the first virtual update figure in the virtual figure display region including the second virtual figure.

The third update unit 133 is configured to update, in response to a trigger operation on the first object media data based on the first object media data includes second-type image data, the first virtual figure based on the second-type image data to obtain the first virtual update figure matching the second-type image data.

The fourth update unit 134 is configured to update the first virtual figure to the first virtual update figure in the virtual figure display region including the second virtual figure.

For specific implementations of the first update unit 131, the second update unit 132, the third update unit 133, and the fourth update unit 134, refer to the descriptions about operation S103 in the embodiment corresponding to FIG. 3. Elaborations are omitted herein.

The conversation interface includes the message display region configured to display a historical conversation message. The historical conversation message is a recorded conversation message in the conversation between the first object and the second object.

The region hiding module 14 is configured to hide, in response to a hiding operation on the message display region, the message display region on the conversation interface, and determine a display interface on which the virtual figure display region is as a conversation update interface.

The second update module 15 is configured to update the first virtual figure on the conversation update interface from the partial virtual figure of the first object to a complete virtual figure of the first object, update the second virtual figure from the partial virtual figure of the second object to a complete virtual figure of the second object, and display, on the conversation update interface in the conversation between the first object and the second object, a second conversation message transmitted by the first object to the second object.

The status switching module 16 is configured to update a service status of the first object to a service update status in response to a switching operation on the service status of the first object, and update, in the virtual figure display region including the second virtual figure, the first virtual figure to a second virtual update figure matching the service update status.

The message generation module 17 is configured to determine, based on the object image data is not captured, third-type image data based on the first virtual figure, integrate the third-type image data and the voice information to obtain the first object media data associated with the first object, and generate, based on the first object media data, the first conversation message for transmission to the second object.

The voice playing module 18 is configured to play the voice information in response to a trigger operation on the first object media data carried in the first conversation message, display, in the message display region, a sound effect animation associated with the voice information, and highlight the converted text information synchronously in the first conversation message.

The third display module 19 is configured to display the first-type image data in the virtual figure display region.

The background update module 20 is configured to determine, in the virtual figure display region, a virtual background associated with the first virtual figure and the second virtual figure as an original virtual background, update, in response to detecting that the first conversation message carries a background mapping text, the original virtual background to a virtual update background based on the background mapping text, and perform data fusion on the first virtual update figure, the second virtual figure, and the virtual update background to obtain a background-fused virtual figure for displaying in the virtual figure display region.

The fourth display module 21 is configured to display, based on a third conversation message transmitted by the second object is received, the third conversation message in the message display region of the conversation interface. The third conversation message carries second object media data associated with the second object.

The third update module 22 is configured to update the second virtual figure to a third virtual update figure in the virtual figure display region including the second virtual figure. The third virtual update figure is obtained by updating the second virtual figure based on the second object media data.

For specific implementations of the first display module 11, the second display module 12, the first update module 13, the region hiding module 14, the second update module 15, the status switching module 16, the message generation module 17, the voice playing module 18, the third display module 19, the background update module 20, the fourth display module 21, and the third update module 22, refer to the descriptions about operation S101 to operation S103 in the embodiment corresponding to FIG. 3, or refer to the descriptions about operation S201 to operation S207 in the embodiment corresponding to FIG. 10. Elaborations are omitted herein. In addition, beneficial effects of the same method are not described herein again.

Figure 19:
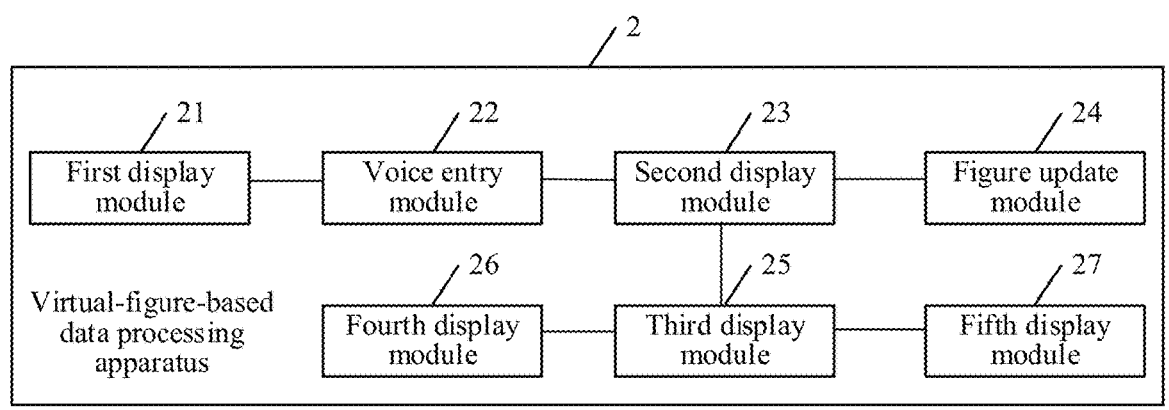
FIG. 19 is a schematic diagram of a structure of a virtual-figure-based data processing apparatus according to some embodiments of the disclosure.

Refer to FIG. 19. FIG. 19 is a schematic diagram of a structure of a virtual-figure-based data processing apparatus according to some embodiments of the disclosure. The virtual-figure-based data processing apparatus may be a computer program (including program code) run in a computer device. For example, the virtual-figure-based data processing apparatus is application software. The apparatus may be configured to perform corresponding operations in the virtual-figure-based data processing method provided in the embodiments of the disclosure. As shown in FIG. 19, the virtual-figure-based data processing apparatus 2 may include a first display module 21, a voice entry module 22, a second display module 23, a figure update module 24, a third display module 25, a fourth display module 26, and a fifth display module 27.

The first display module 21 is configured to display a conversation interface for a conversation between a first object and a second object, and display a first virtual figure of the first object and a second virtual figure of the second object in a virtual figure display region of the conversation interface.

The voice entry module 22 is configured to output, in response to a trigger operation on the conversation interface, an image capturing region configured to capture object image data of the first object, and display, during entry of voice information by the first object by using a voice control in the image capturing region, conversation image data of the first object in the conversation.

The second display module 23 is configured to display, in a message display region of the conversation interface, a first conversation message transmitted by the first object to the second object. The first conversation message carries first object media data associated with the first object. The first object media data is determined based on the conversation image data and the voice information.

The figure update module 24 is configured to update the first virtual figure to a first virtual update figure in the virtual figure display region including the second virtual figure. The first virtual update figure is obtained by updating the first virtual figure based on the first object media data.

The first object media data includes the conversation image data carrying the voice information. The conversation image data is generated based on the captured object image data of the first object. In some embodiments, the conversation image data is obtained by adjusting a figure status of the first virtual figure based on the captured object image data of the first object.

The third display module 25 is configured to play the voice information in response to a trigger operation on the first object media data carried in the first conversation message, and display, in the message display region, a sound effect animation of the conversation image data carrying the voice information.

The first conversation message further includes first converted text information obtained by performing voice conversation processing on the voice information in the image capturing region.

The fourth display module 26 is configured to highlight the first converted text information synchronously in the message display region during displaying of the sound effect animation of the conversation image data carrying the voice information in the message display region.

The fifth display module 27 is configured to perform, during displaying of a sound effect animation of the conversation image data carrying the voice information in the message display region, voice conversion processing on the voice information to obtain second converted text information corresponding to the voice information, and highlight the second converted text information synchronously in the message display region.

For specific implementations of the first display module 21, the voice entry module 22, the second display module 23, the figure update module 24, the third display module 25, the fourth display module 26, and the fifth display module 27, refer to the descriptions about operation S301 to operation S307 in the embodiment corresponding to FIG. 16. Elaborations are omitted herein. In addition, beneficial effects of the same method are not described herein again.

Figure 20:
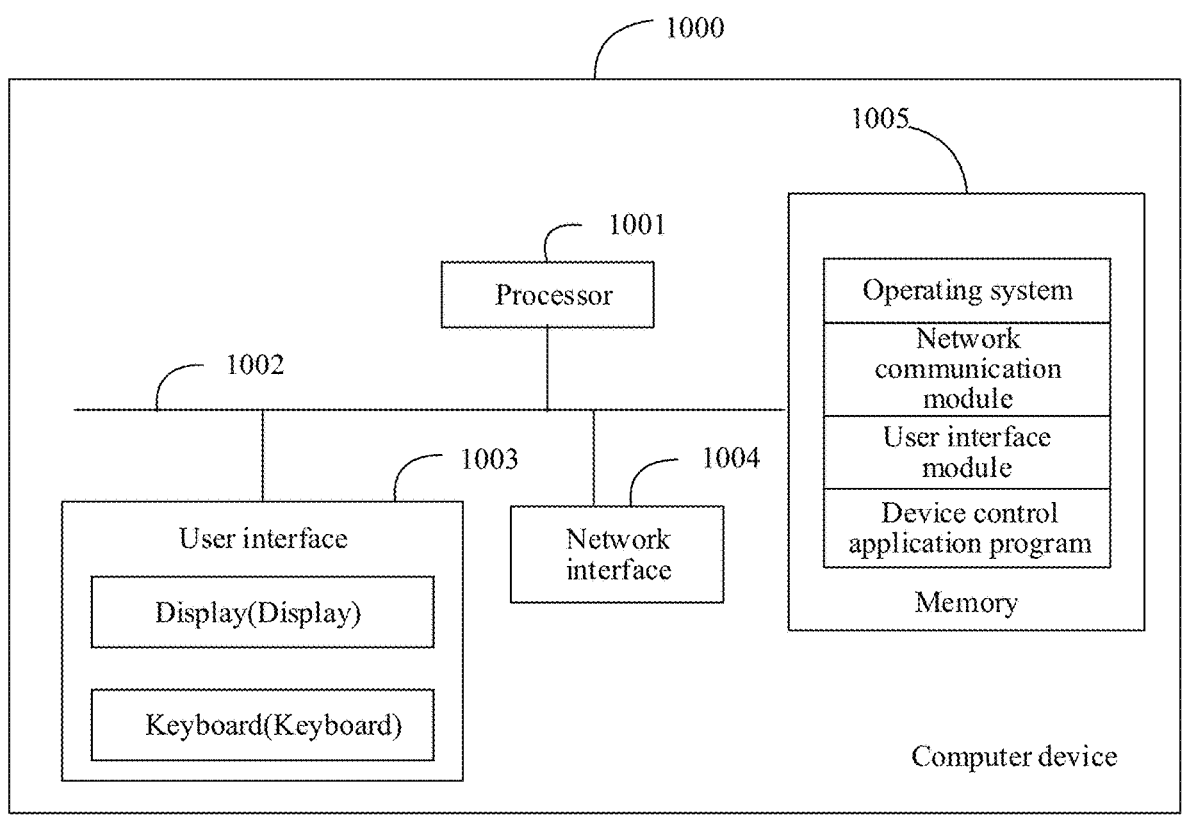
FIG. 20 is a schematic diagram of a structure of a computer device according to some embodiments of the disclosure.

Refer to FIG. 20. FIG. 20 is a schematic diagram of a structure of a computer device according to some embodiments of the disclosure. As shown in FIG. 20, the computer device 1000 may include a processor 1001, a network interface 1004, and a memory 1005. In addition, the computer device 1000 may further include a user interface 1003 and at least one communication bus 1002. The communication bus 1002 is configured to implement connection and communication between these components. The user interface 1003 may include a display and a keyboard. Optionally, the user interface 1003 may further include a standard wired interface and wireless interface. In some embodiments, the network interface 1004 may include a standard wired interface and a standard wireless interface (for example, a wireless fidelity (Wi-Fi) interface). The memory 1004 may be a high-speed random access memory (RAM), or a non-volatile memory, for example, at least one disk memory. In some embodiments, the memory 1005 may be at least one storage apparatus far from the processor 1001. As shown in FIG. 20, as a computer-readable storage medium, the memory 1005 may include an operating system, a network communication module, a user interface module, and a device control application program.

In the computer device 1000 shown in FIG. 20, the network interface 1004 may provide a network communication function. The user interface 1003 is mainly configured to provide an input interface for a user. The processor 1001 may be configured to invoke the device control application program stored in the memory 1005 to execute the descriptions about the virtual-figure-based data processing method in the embodiment corresponding to any one of FIG. 3, FIG. 10, FIG. 16, and FIG. 17. Elaborations are omitted herein. In addition, beneficial effects of the same method are not described herein again.

In addition, some embodiments of the disclosure also provide a computer-readable storage medium. The computer-readable storage medium stores a computer program executed by the foregoing virtual-figure-based data processing apparatus 1 and virtual-figure-based data processing apparatus 2. The computer program includes program instructions. The processor, when executing the program instructions, may execute the descriptions about the virtual-figure-based data processing method in the embodiment corresponding to any one of FIG. 3, FIG. 10, FIG. 16, and FIG. 17. Therefore, elaborations are omitted herein. In addition, beneficial effects of the same method are not described herein again. For technical details that are not disclosed in the embodiment of the computer-readable storage medium involved in the disclosure, refer to the descriptions in the method embodiment of the disclosure.

The computer-readable storage medium may be an internal storage unit of the virtual-figure-based data processing apparatus or the computer device provided in any one of the foregoing embodiments, for example, a hard disk or an internal memory of the computer device. The computer-readable storage medium may in some embodiments be an external storage device of the computer device, for example, a plug-in hard disk, a smart media card (SMC), a secure digital (SD) card, or a flash card on the computer device.

Further, the computer-readable storage medium may in some embodiments include both an internal storage unit and an external storage device of the computer device. The computer-readable storage medium is configured to store the computer program and another program and data that are required by the computer device. The computer-readable storage medium may further be configured to temporarily store data that has been output or is to be output.

In addition, some embodiments of the disclosure also provide a computer program product or computer program. The computer program product or computer program includes computer instructions. The computer instructions are stored in a computer-readable storage medium. A processor of a computer device reads the computer instructions from the computer-readable storage medium. The processor executes the computer instructions to enable the computer device to perform the method provided in the embodiment corresponding to any one of FIG. 3, FIG. 10, FIG. 16, and FIG. 17. In addition, beneficial effects of the same method are not described herein again. For technical details that are not disclosed in the embodiment of the computer program product or computer program involved in the disclosure, refer to the descriptions in the method embodiment of the disclosure.

It may be realized by a person of ordinary skill in the art that the units and the algorithm operations in each example described with reference to the embodiments disclosed herein may be implemented by electronic hardware, computer software, or a combination thereof. For clarity of description about the exchangeability of hardware and software, the compositions and the operations in each example have been generally described in the foregoing description according to functions. Whether these functions are executed by hardware or software depends on specific applications and design constraints of the technical solutions. A person skilled in the art may use different methods to implement the described functions for each particular application, but it is not to be considered that the implementation goes beyond the scope of the disclosure.

The above is only the preferred embodiment of the disclosure and certainly not intended to limit the scope of the disclosure. Therefore, equivalent variations made according to the claims of the disclosure also fall within the scope of the disclosure.

What is claimed is:

1. A virtual-figure-based data processing method, performed by a computer device, the method comprising:
    obtaining a figure resource identifier and a service status of a first object, wherein the service status is selected from online, offline, busy, resting, gaming, and invisible;
    determining whether a virtual figure buffer contains a first virtual figure matching the figure resource identifier and the service status;
    based on the virtual figure buffer containing a matching virtual figure, acquiring the first virtual figure;
    displaying a conversation interface for a conversation between the first object and a second object, and displaying the first virtual figure of the first object and a second virtual figure of the second object in a virtual figure display region of the conversation interface;
    displaying, in a message display region of the conversation interface in response to a trigger operation on the conversation interface, a first conversation message transmitted by the first object to the second object, the first conversation message carrying first object media data associated with the first object; and
    updating the first virtual figure to a first virtual update figure in the virtual figure display region comprising the second virtual figure, the first virtual update figure being obtained by updating the first virtual figure based on both the first object media data and position data of points of the first object.

2. The method according to claim 1, wherein the displaying a first virtual figure of the first object and a second virtual figure of the second object in a virtual figure display region of the conversation interface comprises:
    determining a partial virtual figure for representing the first object as the first virtual figure of the first object, and determining a partial virtual figure for representing the second object as the second virtual figure of the second object; and
    displaying the first virtual figure and the second virtual figure in the virtual figure display region of the conversation interface.

3. The method according to claim 2, wherein the conversation interface comprises the message display region configured to display a historical conversation message;
    the historical conversation message is a recorded conversation message in the conversation between the first object and the second object; and the method further comprises:
    hiding the message display region on the conversation interface in response to a hiding operation on the message display region, and determining a display interface on which the virtual figure display region is as a conversation update interface;
    updating the first virtual figure from the partial virtual figure of the first object to a complete virtual figure of the first object on the conversation update interface, and updating the second virtual figure from the partial virtual figure of the second object to a complete virtual figure of the second object; and
    displaying, on the conversation update interface in the conversation between the first object and the second object, a second conversation message transmitted by the first object to the second object.

4. The method according to claim 1, further comprising:
    updating a service status of the first object to a service update status in response to a switching operation on the service status of the first object, and updating, in the virtual figure display region comprising the second virtual figure, the first virtual figure to a second virtual update figure matching the service update status.

5. The method according to claim 1, wherein the displaying, in a message display region of the conversation interface in response to a trigger operation on the conversation interface, a first conversation message transmitted by the first object to the second object comprises:
    determining, in response to the trigger operation on the conversation interface, first-type image data for representing an object status of the first object in the conversation; and
    determining the first-type image data as the first object media data associated with the first object, generating, based on the first object media data, the first conversation message for transmission to the second object, and displaying the first conversation message in the message display region of the conversation interface.

6. The method according to claim 5, wherein the determining, in response to the trigger operation on the conversation interface, first-type image data for representing an object status of the first object in the conversation comprises:

displaying, in response to a trigger operation on a text entry control on the conversation interface, text information entered by using the text entry control; and displaying, in response to detecting that the text information carries a status mapping text, the first-type image data that is mapped by the status mapping text and that is used for representing the object status of the first object in the conversation.

7. The method according to claim 5, wherein the determining, in response to the trigger operation on the conversation interface, first-type image data for representing an object status of the first object in the conversation comprises:

outputting, in response to a trigger operation on a status display control on the conversation interface, an image selection panel associated with the status display control;

determining, in response to a selection operation on the image selection panel, image data corresponding to the selection operation as the first-type image data for representing the object status of the first object in the conversation; and determining, in response to a determining operation on target image data on the conversation interface, the target image data as the first-type image data for representing the object status of the first object in the conversation.

8. The method according to claim 1, wherein the displaying, in a message display region of the conversation interface in response to a trigger operation on the conversation interface, a first conversation message transmitted by the first object to the second object comprises:

invoking, in response to the trigger operation on the conversation interface during entry of voice information by the first object by using a voice control, a camera to capture object image data of the first object;

adjusting, based on the object image data being captured, a figure status of the first virtual figure based on the object image data, and generating, based on a first virtual figure in an adjusted figure status, second-type image data for representing an object status of the first object in the conversation; and integrating the second-type image data and the voice information to obtain the first object media data associated with the first object, generating, based on the first object media data, the first conversation message for transmission to the second object, and displaying the first conversation message in the message display region of the conversation interface.

9. The method according to claim 8, wherein the adjusting, based on the object image data being captured, a figure status of the first virtual figure based on the object image data and generating, based on a first virtual figure in an adjusted figure status, second-type image data for representing an object status of the first object in the conversation comprises:

performing, in the case that the object image data is captured, status detection on the object image data, and determining a detected status as the object status of the first object in the conversation; and obtaining the first virtual figure, adjusting the figure status of the first virtual figure based on the object status, and generating, based on the first virtual figure in the adjusted figure status, the second-type image data for representing the object status.

10. The method according to claim 8, wherein the integrating the second-type image data and the voice information to obtain the first object media data associated with the first object comprises:

uploading the second-type image data to a server, and obtaining, based on the second-type image data being successfully uploaded, an image resource identifier corresponding to the second-type image data;

uploading the voice information to the server, and obtaining, based on the voice information being successfully uploaded, a voice resource identifier corresponding to the voice information; and integrating the second-type image data carrying the image resource identifier and the voice information carrying the voice resource identifier to obtain the first object media data associated with the first object.

11. A virtual-figure-based data processing apparatus comprising:

at least one memory configured to store program code; and at least one processor configured to read the program code and operate as instructed by the program code, the program code comprising:

obtaining code configured to cause the at least one processor to obtain a figure resource identifier and a service status of a first object, wherein the service status is selected from online, offline, busy, resting, gaming, and invisible;

determining code configured to cause the at least one processor to determine whether a virtual figure buffer contains a first virtual figure matching the figure resource identifier and the service status;

acquiring code configured to cause the at least one processor to, based on the virtual figure buffer containing a matching virtual figure, acquire the first virtual figure;

conversation display code configured to cause the at least one processor to display a conversation interface for a conversation between the first object and a second object, and displaying the first virtual figure of the first object and a second virtual figure of the second object in a virtual figure display region of the conversation interface;

message display code configured to cause the at least one processor to display, in a message display region of the conversation interface in response to a trigger operation on the conversation interface, a first conversation message transmitted by the first object to the second object, the first conversation message carrying first object media data associated with the first object; and updating code configured to cause the at least one processor to update the first virtual figure to a first virtual update figure in the virtual figure display region comprising the second virtual figure, the first virtual update figure being obtained by updating the first virtual figure based on both the first object media data and position data of points of the first object.

12. The apparatus according to claim 11, wherein the conversation display code is further configured to:

figure determining code configured to cause the at least one processor to determine a partial virtual figure for representing the first object as the first virtual figure of the first object, and determine a partial virtual figure for representing the second object as the second virtual figure of the second object; and figure displaying code configured to cause the at least one processor to display the first virtual figure and the second virtual figure in the virtual figure display region of the conversation interface.

13. The apparatus according to claim 12, wherein the conversation interface comprises the message display region configured to display a historical conversation message;

the historical conversation message is a recorded conversation message in the conversation between the first object and the second object; and the apparatus further comprises:

hiding code configured to cause the at least one processor to hide the message display region on the conversation interface in response to a hiding operation on the message display region, and determining a display interface on which the virtual figure display region is as a conversation update interface;

updating code configured to cause the at least one processor to update the first virtual figure from the partial virtual figure of the first object to a complete virtual figure of the first object on the conversation update interface, and updating the second virtual figure from the partial virtual figure of the second object to a complete virtual figure of the second object; and update displaying code configured to cause the at least one processor to display, on the conversation update interface in the conversation between the first object and the second object, a second conversation message transmitted by the first object to the second object.

14. The apparatus according to claim 11, further comprising:

service updating code configured to cause the at least one processor to update a service status of the first object to a service update status in response to a switching operation on the service status of the first object, and updating, in the virtual figure display region comprising the second virtual figure, the first virtual figure to a second virtual update figure matching the service update status.

15. The apparatus according to claim 11, wherein the message displaying code further comprises:

image determining code configured to cause the at least one processor to determine, in response to the trigger operation on the conversation interface, first-type image data for representing an object status of the first object in the conversation; and media determining code configured to cause the at least one processor to determine the first-type image data as the first object media data associated with the first object, generating, based on the first object media data, the first conversation message for transmission to the second object, and displaying the first conversation message in the message display region of the conversation interface.

16. The apparatus according to claim 15, wherein the image determining code is further configured to:

display, in response to a trigger operation on a text entry control on the conversation interface, text information entered by using the text entry control; and display, in response to detecting that the text information carries a status mapping text, the first-type image data that is mapped by the status mapping text and that is used for representing the object status of the first object in the conversation.

17. The apparatus according to claim 15, wherein the image determining code is further configured to:

output, in response to a trigger operation on a status display control on the conversation interface, an image selection panel associated with the status display control;

determine, in response to a selection operation on the image selection panel, image data corresponding to the selection operation as the first-type image data for representing the object status of the first object in the conversation; and determine, in response to a determining operation on target image data on the conversation interface, the target image data as the first-type image data for representing the object status of the first object in the conversation.

18. The apparatus according to claim 11, wherein the message display code further comprises:

invoking code configured to cause the at least one processor to invoke, in response to the trigger operation on the conversation interface during entry of voice information by the first object by using a voice control, a camera to capture object image data of the first object;

adjusting code configured to cause the at least one processor to adjust, based on the object image data being captured, a figure status of the first virtual figure based on the object image data, and generating, based on a first virtual figure in an adjusted figure status, second-type image data for representing an object status of the first object in the conversation; and integrating code configured to cause the at least one processor to integrate the second-type image data and the voice information to obtain the first object media data associated with the first object, generating, based on the first object media data, the first conversation message for transmission to the second object, and displaying the first conversation message in the message display region of the conversation interface.

19. The apparatus according to claim 18, wherein the adjusting code is further configured to:

perform, based on the object image data being captured, status detection on the object image data, and determining a detected status as the object status of the first object in the conversation; and obtain the first virtual figure, adjusting the figure status of the first virtual figure based on the object status, and generating, based on the first virtual figure in the adjusted figure status, the second-type image data for representing the object status.

20. A non-transitory computer-readable medium storing computer code that when executed by at least one processor causes the at least one processor to:

obtain a figure resource identifier and a service status of a first object, wherein the service status is selected from online, offline, busy, resting, gaming, and invisible;

determine whether a virtual figure buffer contains a first virtual figure matching the figure resource identifier and the service status;

based on the virtual figure buffer containing a matching virtual figure, acquire the first virtual figure;

display a conversation interface for a conversation between the first object and a second object, and displaying the first virtual figure of the first object and a second virtual figure of the second object in a virtual figure display region of the conversation interface;

display, in a message display region of the conversation interface in response to a trigger operation on the conversation interface, a first conversation message transmitted by the first object to the second object, the first conversation message carrying first object media data associated with the first object; and update the first virtual figure to a first virtual update figure in the virtual figure display region comprising the second virtual figure, the first virtual update figure being obtained by updating the first virtual figure based on both the first object media data and position data of points of the first object.

\* \* \* \* \*